US006638493B2

(12) United States Patent
Andersen et al.

(10) Patent No.: US 6,638,493 B2
(45) Date of Patent: *Oct. 28, 2003

(54) METHOD FOR PRODUCING HYDROGEN

(76) Inventors: Erling Reidar Andersen, o/s Thor Andersen, Gluppeveien 35, 1614 Frederikstad (NO); Erling Jim Andersen, P.O. Box 743, New Denmark, New Brunswick (CA), E7G 4H3

( * ) Notice: Subject to any disclaimer, the term of this patent is extended or adjusted under 35 U.S.C. 154(b) by 0 days.

This patent is subject to a terminal disclaimer.

(21) Appl. No.: 10/319,522

(22) Filed: Dec. 16, 2002

(65) Prior Publication Data

US 2003/0143155 A1 Jul. 31, 2003

Related U.S. Application Data

(63) Continuation-in-part of application No. 09/620,250, filed on Jul. 20, 2000, now Pat. No. 6,506,360.

(51) Int. Cl.[7] .............................. C01B 3/08; C01F 7/02
(52) U.S. Cl. ...................................... 423/657; 423/627
(58) Field of Search .................................. 423/657, 627

(56) References Cited

U.S. PATENT DOCUMENTS 490,437 A    1/1893   Hawkins (List continued on next page.)

FOREIGN PATENT DOCUMENTS

| CA | 2116468 | 10/1998 |
|----|---------|---------|
| CA | 2225978 | 6/1999 |
| DE | 2436002 | 12/1976 |
| DE | 3401194 | 7/1985 |
| EP | 312078 | 4/1989 |
| FR | 2465683 | 4/1981 |
| JP | 401208301 | 2/1988 |
| WO | WO 94/18117 | 8/1994 |

OTHER PUBLICATIONS

Stockburger, D. et al., "On–line hydrogen Generation from Aluminum in an Alkaline Solution". (no month). Proc.–Electrochem. Soc. (1992), 92–5 (Proc.Symp. Hydrogen Storage Mater.
Batteries, Electrochem., 1991), 431–44, 1992, XP–001032928. (No month).
Belitskus, David: "Reaction of Aluminum with Sodium Hydroxide Solution as a Source of Hydrogen", J. Electrochem. Soc. (1970), (Aug.), 1097–9, 1970, XP–002180270.

*Primary Examiner*—Wayne A. Langel
(74) *Attorney, Agent, or Firm*—Palmer C. DeMeo; Mario Theriault

(57) ABSTRACT

The process for producing hydrogen gas according to the present invention consists of reacting aluminum with water in the presence of sodium hydroxide as a catalyst. In one aspect of the present invention, there is provided a process for producing hydrogen gas, comprising the steps of: providing an aqueous solution containing between 0.26 M and 19 M NaOH in a vessel. The next step consists of reacting aluminum with water at the surface of the solution to generate a region of effervescence at the surface of the solution and a precipitate sinking from the region of effervescence to the bottom of the vessel. The region of effervescence is kept separated from the precipitate at the bottom the vessel, to prevent any precipitate from mixing with the aluminum therein.

16 Claims, 11 Drawing Sheets

U.S. PATENT DOCUMENTS

| | | | |
|---|---|---|---|
| 767,289 A | 8/1904 | Kirkwood | |
| 909,536 A | 9/1909 | Brindley | |
| 934,036 A | 9/1909 | Brindley | |
| 1,916,473 A | 7/1933 | Forrest | |
| 2,721,789 A | 10/1955 | Gill | 23/282 |
| 3,348,919 A | 10/1967 | Shumway | 23/211 |
| 3,554,707 A | 1/1971 | Holmes | 23/282 |
| 3,942,511 A | 3/1976 | Black et al. | 126/248 |
| 3,957,483 A | 5/1976 | Suzuki | 75/0.5 R |
| 3,975,913 A | 8/1976 | Erickson | 60/645 |
| 4,223,661 A | 9/1980 | Sergev et al. | 126/204 |
| 4,269,818 A | 5/1981 | Suzuki | 423/657 |
| 4,340,580 A | 7/1982 | Suzuki | 423/657 |
| 4,598,552 A | 7/1986 | Weber | 60/673 |
| 4,643,166 A | 2/1987 | Hubele et al. | 126/263 |
| 4,670,018 A | 6/1987 | Cornwell | 44/1 E |
| 4,730,601 A | 3/1988 | Hubele et al. | 126/263 |
| 4,752,463 A | 6/1988 | Nagira et al. | 423/657 |
| 4,769,044 A | 9/1988 | Cornwell | 44/605 |
| 4,882,128 A | 11/1989 | Hukvari et al. | 422/119 |
| 5,143,047 A | 9/1992 | Lee | 126/263 |
| 5,286,473 A | 2/1994 | Hasebe | 423/657 |
| 5,833,934 A | 11/1998 | Adlhart | 422/239 |
| 5,867,978 A | 2/1999 | Klanchar et al. | 60/39.182 |
| 6,506,360 B1 * | 1/2003 | Andersen et al. | 423/657 |

* cited by examiner

EFFECT OF ADDING WATER TO THE REACTION

METHOD FOR PRODUCING HYDROGEN

This is a Continuation-In-Part of U.S. patent application Ser. No. 09/620,250 filed on Jul. 20, 2000, now U.S. Pat. No. 6,506,360.

FIELD OF THE INVENTION

This invention relates to the production of hydrogen gas from the reaction of aluminum with water in the presence of sodium hydroxide as catalyst.

BACKGROUND OF THE INVENTION

Hydrogen energy is environment-friendly. Because of the actual human ecology concerns, the exploitation of hydrogen as an universal fuel would be greatly acclaimed. During the last two decades or so, the elaboration of a hydrogen-based economy has made important progress on account of numerous research projects such as the hydrogen fuel cell and the hydrogen car. Although these important discoveries constitute milestones toward a pollution-free society, more research is needed to obtain the hydrogen easily and economically.

A convenient source of hydrogen is a reaction of aluminum with water to split the water molecules into hydrogen and oxygen. The hydrogen is released as a gas and the oxygen combines with the aluminum to form aluminum oxide compounds. Aluminum is the third most abundant element after oxygen and silicon in the earth's crust, and constitutes approximately 8% by weight of the earth's crust. Aluminum is a safe material and is commonly used in the food, cosmetics and medical fields. Water is also abundant. Therefore, the reaction of these two elements to produce hydrogen represents an interesting proposal to replace fossil fuels.

Generally speaking, it is known that under certain conditions, aluminum reacts with water to generate hydrogen and heat. It is also known, however, that this type of reaction is not sustainable at ambient temperature. It is believed that a protective oxide layer forms on a metal surface in contact with water at ambient temperature and hinders the reaction. Therefore, it has been accepted by those skilled in the art that the use of aluminum in a reaction with water to generate hydrogen gas requires that the protective oxide layer is efficiently and continuously removed, and that the reaction is kept at an elevated temperature.

A number of hydrogen generators have been developed in the past. The following patent documents constitute a good inventory of the devices and methods of the prior art in the field of hydrogen gas generation using the reaction of aluminum or alloys of aluminum with water.

U.S. Pat. No. 909,536 issued on Jan. 12, 1909, and U.S. Pat. No. 934,036 issued on Sep. 14, 1909, both issued to G. F. Brindley et al. These documents disclose several compositions for generating hydrogen. The compositions comprise any metal which can form an hydroxide when it is brought into contact with a solution of a suitable hydroxide. For example, aluminum is reacted with sodium hydroxide to release hydrogen and to produce sodium aluminate.

U.S. Pat. No. 2,721,789, issued on Oct. 25, 1955 to Q. C. Gill. This document discloses the structure of an hydrogen generator for reacting water with a measured dry charge of aluminum particles and flakes of sodium hydroxide. The reaction releases hydrogen gas and produces sodium aluminate.

U.S. Pat. No. 3,554,707 issued on Jan. 12, 1971 to W. A. Holmes et al. This document discloses a gas generator having bellows to raise or lower the level of water in response to the pressure inside the generator. As the level of water drops, the contact surface between the fuel cartridge and the water is lost and the reaction is terminated.

U.S. Pat. No. 3,957,483 issued on May 18, 1976 to M. Suzuki. This patent discloses a magnesium composition which produces hydrogen upon contact with water. The preferred magnesium composition comprises magnesium, and one or more metals selected from the group consisting of iron, zinc, chromium, aluminum and manganese.

U.S. Pat. No. 3,975,913 issued on Aug. 24, 1976 to D. C. Erickson. This document discloses a hydrogen generator wherein molten aluminum is reacted with water. The generator is kept at a very high temperature to keep the metal in a molten condition.

U.S. Pat. No. 4,643,166 issued on Feb. 17, 1987, and

U.S. Pat. No. 4,730,601 issued on Mar. 15, 1988 both to H. D. Hubele et al. These documents disclose the structure of a fuel cell for producing heat energy and hydrogen gas. The device has a reaction chamber containing a fuel composition that is reactive with water. The fuel composition includes a main fuel part of magnesium and aluminum in a molar ratio of 1:2, and the second part is composed of lithium hydride, magnesium and aluminum in equal molar ratio.

U.S. Pat. No. 4,670,018 issued on Jun. 2, 1987, and

U.S. Pat. No. 4,769,044 issued on Sep. 6, 1988, both to J. H. Cornwell. These documents describe a log made of compressed wood waste and paper. The log is coated with aluminum particles. Upon burning, the aluminum particles react with moisture in the log to emit heat due to the generation of hydrogen gas.

U.S. Pat. No. 4,752,463 issued on Jun. 21, 1988 to K. Nagira et al. This document discloses an alloy which reacts with water for producing hydrogen gas. The alloy material comprises essentially aluminum and 5 to 50% tin.

U.S. Pat. No. 5,143,047 issued on Sep. 1, 1992 to W. W. Lee. This document discloses an apparatus and a method for generating steam and hydrogen gas. In this apparatus, an aluminum or aluminum alloy powder is reacted with water to generate hydrogen gas. An electric power source is used to start the reaction. The electric power source is used to explode an aluminum conductor and to disperse pieces of molten aluminum into a mixture of water and aluminum powder. A heat exchanger is provided to extract useful heat.

U.S. Pat. No. 5,867,978 issued on Feb. 9, 1999 to M. Klanchar et al. This document discloses another hydrogen gas generator using a charge of fuel selected from the group consisting of lithium, alloys of lithium and aluminum. The charge of fuel is molten and mixed with water to generate hydrogen gas.

JP 401,208,30 issued to Mito on Aug. 22, 1989. This document discloses a process for producing hydrogen. Aluminum is reacted with water under an inactive gas or a vacuum to produce hydrogen gas.

CA 2,225,978 published on Jun. 29, 1999 by J. H. Checketts. This patent application discloses a hydrogen generation system wherein a coating on reactive pellets is selectively removed to expose the reactive material to water for producing hydrogen gas on demand. In one embodiment, aluminum and sodium hydroxide are reacted with water to release hydrogen gas and produce sodium aluminate.

DE 3,401,194 published in Jul. 18, 1985 by Werner Schweikert. This document discloses a device for utilizing energy from a chemical reaction between various aluminum alloys and sodium hydroxide. The chemical reaction occurring in this device generates heat, hydrogen gas, a direct current and sodium aluminate as a residue.

FR 2,465,683 published in Mar. 27, 1981 by Guy Ecolasse. This document also discloses a process for producing hydrogen by the reaction of aluminum on sodium hydroxide solution in water. A by-product of this reaction is sodium aluminate.

Belitskus, David. 1970. Technical Note: "Reaction of Aluminum With Sodium Hydroxide Solution as a Source of Hydrogen" J. Electrochem Soc. (1970), (August), Vol. 117. No. 8, pp.1097–9, XP-002180270. This technical paper.describes several experiments wherein aluminum samples including a cylindrical block, uncompacted powders and pellets of various densities have been reacted with aqueous solutions of sodium hydroxide at various concentrations to generate hydrogen gas. In these experiments, the formation of sodium aluminate was observed, as well as the regeneration of sodium hydroxide through the precipitation of aluminum hydroxide.

Stockburger, D. et al. 1991. "On-Line Hydrogen Generation from Aluminum in an Alkaline Solution". Proc.-Electrochem. Soc. (1992), Vol. 92–5 (Proc. Symp. Hydrogen Storage Mater., Batteries, Electrochem., pp. 431–44, 1992, XP-001032928. This technical paper describes three sizes of hydrogen generators in which aluminum is reacted with an aqueous solution of 5.75 M sodium hydroxide. This technical paper also notes the formation of sodium aluminate and the precipitation of aluminum hydroxide that regenerates sodium hydroxide.

Although the chemical reactions of aluminum with water in the presence of sodium hydroxide have been demonstrated in various projects in the past, these reactions were not considered as being safe for use by the general public. Sodium hydroxide is extremely corrosive and must be handled according to particular safety procedures. Therefore, any chemical reaction wherein sodium hydroxide is a consumable would not represent an attractive source of hydrogen for use in vehicles or in household power systems, for examples. As such, it is believed that a need still exists for a method to produce hydrogen gas by the reaction of aluminum and water, wherein the consumables are limited to aluminum and water.

SUMMARY OF THE INVENTION

Broadly stated, the process for producing hydrogen gas according to the present invention consists of reacting aluminum with water in the presence of sodium hydroxide acting as a catalyst.

In accordance with one aspect of the present invention, there is provided a process for producing hydrogen gas, comprising the initial step of: providing an aqueous solution in a vessel. The aqueous solution contains sodium hydroxide in a concentration between 0.26 M and 19 M NaOH.

The next step consists of reacting aluminum with water at the surface of the solution thereby generating a region of effervescence at the surface of the solution and a precipitate sinking to the bottom region of the vessel. The process also includes the step of maintaining the region of effervescence separated from the precipitate at the bottom the vessel, to prevent the precipitate from swirling and mixing with the aluminum in the reaction zone at the surface of the solution. This process is advantageous because it proceeds catalytically with the sodium hydroxide acting as the catalyst.

The process mentioned above is best carried out with an aqueous solution containing between about 5M and 10 M NaOH. The process is also more efficient when makeup water is added only after an initial amount of aluminum has been consumed, and when the temperature of the aqueous solution has reached a peak or 75° C.

In accordance with another aspect of the present invention, there is provided a process for initiating and maintaining a catalytic reaction of aluminum with water for producing hydrogen gas. The process comprises the initial step of providing an aqueous solution in a vessel. This aqueous solution contains a portion of NaOH and a portion of water. The next steps consist of introducing a portion of aluminum in the aqueous solution, and reacting that portion of aluminum with the portion of water. The process also includes the steps of maintaining constant the portion of NaOH in the vessel and adding additional portions of water and additional portions of aluminum in the vessel according to the rates of consumption of the aluminum and the water in the reaction.

Again, this process is best carried out with an aqueous solution of between 1.2 M and 19 M NaOH and at a temperature between 4° C. and 170° C.

In yet another aspect of the present invention, there is provided a process for simultaneously producing hydrogen gas and alumina ($Al_2O_3$). This process firstly comprises the step of providing an aqueous solution in a vessel. The aqueous solution contains sodium hydroxide in a concentration between 0.26 M and 19 M NaOH. The next step consists of reacting aluminum with water at a surface of the aqueous solution and generating hydrogen gas and alumina. The process also includes the step of recovering hydrogen gas from the surface of the aqueous solution and alumina from a bottom region of the vessel.

Other advantages and novel features of the present invention will become apparent from the following detailed description,.

BRIEF DESCRIPTION OF THE DRAWINGS

A preferred embodiment of the process according to the present invention selected by way of examples will now be described with reference to the accompanying drawings, in which.

DETAILED DESCRIPTION OF THE PREFERRED EMBODIMENT

Figure 1:
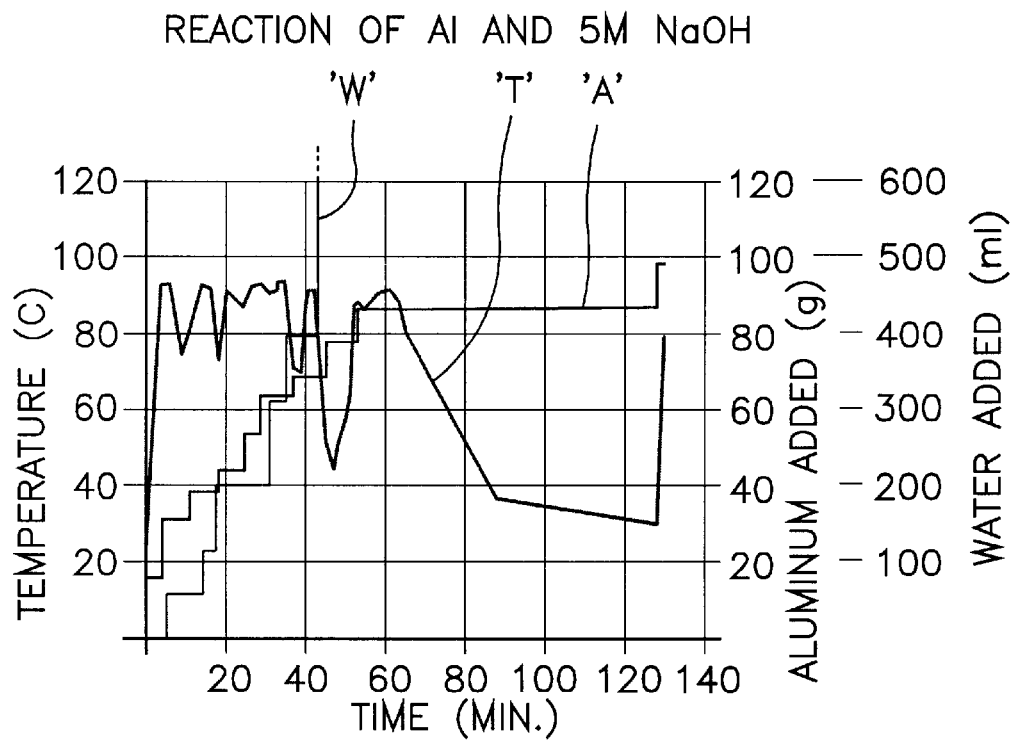
FIG. 1 is graph illustrating a first reaction of aluminum with water to produce hydrogen gas, in a 5.0 M sodium hydroxide solution, carried out over a period of about 130 minutes.

In the present invention it is believed that aluminum reacts with water under certain conditions in the presence of sodium hydroxide as a catalyst. It is believed that the reaction is carried out according to the equation (1) or possibly (2), or some combination of the two, as follows;

$$2Al + 3H_2O \rightarrow Al_2O_3 + 3H_2 \tag{1}$$

catalyst=NaOH $$2Al + 6H_2O \rightarrow Al_2(OH)_3 + 3H_2 \tag{2}$$

catalyst=NaOH

In one of the most pertinent prior art documents, the U.S. Pat. No. 934,036, it is taught that aluminum reacts with water and sodium hydroxide according to one of the following formulas;

$$2Al + 2NaOH + xH_2O \rightarrow Na_2Al_2O_4 + xH_2O + 3H_2 \tag{3}$$

$$2Al + 6NaOH + xH_2O \rightarrow Na_6Al_2O_6 + xH_2O + 3H_2 \tag{4}$$

In other relevant prior art documents, Stockburger and Belitskus teach that aluminum reacts with an alkaline solution of NaOH and that NaOH is subsequently regenerated by the precipitation of $Al(OH)_3$ as described by the formulas (5) and (6) respectively.

$$2Al + 2NaOH + 6H_2O \rightarrow 2NaAl(OH)_4 + 3H_2 \tag{5}$$

$$2NaAl(OH)_4 \rightarrow 2NaOH + 2Al(OH)_3 \downarrow \tag{6}$$

It is also taught in Stockburger, that an optimum concentration of the alkaline solution should be maintained at 5.75 M NaOH for an acceptable reaction rate, and in Belitskus that the rate of precipitation of $Al(OH)_3$ and the regeneration of NaOH is insufficient to support rapid reaction rates.

The following experiments were carried out to demonstrate that under certain conditions, the sodium hydroxide is not consumed in the reaction but acts as a catalyst to the reaction as described in equation (1) or (2).

Experiments 1-1 to 1-8

A first series of eight experiments was carried out to measure the volume of hydrogen gas produced in a typical reaction. In these experiments, aluminum foil from Reynolds Aluminum Company of Canada was loosely crumpled and placed in a one liter plastic bottle containing 500 ml of catalytic solution of about 4.5M NaOH. The bottle was quickly capped with a cover fitted with a tube which led to an inverted volumetric cylinder filled with water. The bottle was immersed in a water bath to prevent overheating.

The volume of water displaced by the gas produced was measured and corrected to a gas volume at standard temperature and pressure (STP). Atmospheric pressure on that day was obtained from a local weather office. The corrected volume of gas produced was compared to the theoretical quantity of hydrogen gas, which would be obtained according to the equation, $$2Al + 3H_2O \rightarrow Al_2O_3 + 3H_2 \tag{1}$$

These experiments were carried out at a room temperature of 21° C. and an atmospheric pressure of 758 mm of Hg. In all cases the reaction started in few seconds and continued for few minutes, until depletion of the aluminum foil. It was noticed that a typical reaction with less than 5 grams of loosely crumpled aluminum foil, is complete in less than 5 minutes. The results of these experiments are shown in Table 1 below.

TABLE 1

Hydrogen Gas Production from Aluminum Foil

| Exp. (#) | Al (g.) | $H_2$ (l) | $H_2$ (l) (STP) | $H_2$ (l) Theoretical | Yield (%) | Deviation (+/− %) |
|---|---|---|---|---|---|---|
| 1-1 | 2.08 | 2.94 | 2.71 | 2.59 | 104 | 2.6 |
| 1-2 | 2.03 | 2.85 | 2.62 | 2.53 | 104 | 2.6 |
| 1-3 | 2.21 | 3.05 | 2.81 | 2.75 | 102 | 2.5 |
| 1-4 | 2.16 | 2.9 | 2.67 | 2.69 | 99 | 2.6 |
| 1-5 | 2.2 | 3.04 | 2.8 | 2.74 | 102 | 2.5 |
| 1-6 | 2.21 | 3.04 | 2.8 | 2.76 | 102 | 2.5 |
| 1-7 | 0.73 | 1.03 | 0.94 | 0.91 | 103 | 2.4 |
| 1-8 | 0.83 | 1.15 | 1.05 | 1.03 | 102 | 2.2 |
| Ave. | | | | | 102 | 2.47 |

The results from Table 1 show that the reaction is reproducible and produces stoichiometric quantities of hydrogen gas. The 102% average yield of hydrogen gas is considered to be within the measurement uncertainty; however, there are at least two factors which might have contributed to a slightly higher hydrogen yield. Firstly, the volume of gas produced was corrected to STP. It is possible that the exhausted fume hood in which the experiments were carried out could have lowered the reaction pressure below the atmospheric pressure of 758 mm of Hg. This would have increased the observed value for the volume of gas produced. An exhaust bench typically runs at 1 inch or 2 inches of water pressure. At a maximum, this could have increased the measured volume by about 0.5%.

Secondly, the water used was tap water in all cases, in which dissolved air may have been present. If any of this air had been released in the presence of the warm hydrogen gas, this would have increased the volume of gas; measured. This would have affected the results by less than 1%. Since the results are within the measurement error, and quantification of these two sources of error would not significantly affect the results, no further experiment was carried out in this area.

Experiments 1-9 and 1-10

The procedure used in the above experiments was repeated, with the exception that the tube leading from the top of the reaction bottle was connected to a gas sampling bag. Two samples of gas were obtained and, analysed. The results are presented in Table 2.

TABLE 2

Gas Analysis

| Sample | Hydrogen Concentration | Oxygen & Nitrogen |
|---|---|---|
| 1 (1-9) | 92% | balance |
| 2 (1-10) | 98% | balance |

Table 2 shows that the purity of the hydrogen collected in the second sample was 98%. This is close to what was theoretically expected. The lower 92% concentration observed in the first sample was probably due to the fact the system was not completely purged with hydrogen before the sample was taken. By the time the second sample was taken, most of the air had been purged from the tube and the reaction bottle.

Experiment 1-11

The procedure used in the first mentioned experiments was repeated except that the reaction bottle was placed in a water bath before the aluminum was added to the water, and the hydrogen produced was bubbled through the bath water. The temperature of the bath and the catalytic solution were measured before and after the reaction, and at about four minutes after the reaction was completed.

The water equivalent of the plastic containers for absorbing heat and their specific heat were determined experimentally by adding a known quantity of hot water to the reaction system at room temperature and then calculating the heat transfer based on the final temperature.

The quantity of heat produced by the reaction was determined and compared with the theoretical values. The results are shown in Table 3.

TABLE 3

Heat of the Reaction

| Readings | Temp. °C. Reactor Start | Temp. °C. Bath Start | Temp. °C. Reactor Finish | Temp. °C. Bath Finish | Time |
|---|---|---|---|---|---|
| 1 (1-11) | 21.1 | 20.2 | 45.5 | 24.4 | 5.29 |
| 2 (1-11) | 21.1 | 20.2 | 38.3 | 25.3 | 5.33 |

| Readings | Al (g) | Heats of Formation $Al_2O_3$ kcal/mole | Heat of Formation $H_2O$ kcal/mole | Heat Output Actual kcal | Heat Output Theoretical kcal | Efficiency (%) |
|---|---|---|---|---|---|---|
| 1 (1-11) | 9.52 | −400.5 | −68.3 | 33.3 | 34.5 | 96 |
| 2 (1-11) | 9.52 | −400.5 | −68.3 | 32.5 | 34.5 | 94 |

The results in Table 3 show that the observed heat released in the production of hydrogen was 96% of the theoretical value. The 94% value from the second reading can be attributed to the heat lost to the surroundings during the time that lapsed between the readings.

The reaction has a net maximum heat production during hydrogen generation of 195.6 kCal/mole. A further 204.9 kCal/mole will be released if the hydrogen is burned with oxygen. Stated another way, 51% of the reaction energy is used to form hydrogen gas and 49% goes into the production of heat.

Experiment 2-1

With 5.00 M NaOH Alkaline Solution

Sodium hydroxide (NaOH) pellets (40.63 g) from Wiler Fine Chemicals were placed in a two liter Erlenmeyer flask. Tap water (200 ml) was added to the flask. The mixture was swirled and allowed to stand on the lab bench. The lab temperature was 25° C. After about an hour, aluminum (Al) foil (30.72 g) was added in two portions. The first addition of aluminum is referred to as time zero, the start of the reaction. The temperature of the vapour coming from the top of the flask was measured using a thermometer and was found to be 93° C. four minutes after the first half of the Al had been added. The flask was open to the atmosphere. The reaction was carried out for a period of 130 minutes. Additional quantities of Al and water were added at regular intervals, and the temperature was observed and recorded.

The flask was swirled periodically to ensure the solution was in contact with the Al. No further NaOH was added.

During this first experiment, a total amount of 98.7 g of aluminum was added, and 650 ml of water was added to the initial volume. A graphic illustration of this Experiment 2-1 is shown in FIG. 1. In this illustration, the heavy curve labelled as 'T' indicates the temperature of the vapour coming out of the flask; the medium density curve labelled 'A' indicates the amount of aluminum added; and the lighter curve 'W' indicates the water added. The same labelling is used for all the experiments illustrated herein.

The addition of Al to the NaOH solution resulted in the production of vapour which issued from the neck of the flask at temperatures above 90° C. Furthermore, this production of hot vapour started within a few minutes (less than 4 minutes) of the Al being added. The reaction proceeded vigorously with the addition of each charge of Al. Furthermore, even when there was a delay between charges, such as at the 36 minute and 44 minute additions, the reaction proceeded. Indeed, even when the addition of Al was delayed for 41 minutes and the reaction mixture had been allowed to cool, the reaction still proceeded vigorously (at about 128 minutes) when Al was added and the mixture was swirled.

It is to be noted that the amount of aluminum consumed in this reaction is about 3.6 times the amount predicted by the formulas (3) and (5), and about 10.8 times the amount predicted by the equation (4). These findings confirm the catalytic nature of the reaction according to the present invention.

Experiment 2-2
With 4.95 M NaOH Alkaline Solution.

To tap water (100 ml) in a one liter suction flask was added NaOH pellets (20.12 g) from Willer Fine Chemicals. The mixture was swirled to aid solvation. The lab temperature was 23° C. Two thermocouples were inserted through the suction inlet on the flask. The flask was open to the atmosphere. Thermocouple 1 (TC1) was placed in the NaOH solution about one centimeter from the bottom of the flask. The junction of thermocouple 2 (TC2) was placed in the flask neck at the same level as, the suction inlet. The thermocouples were read by a Scimetric System 200 data recorder which stored the temperature readings at five second intervals. After about half an hour TC1 and TC2 read 31° C. and 21° C. respectively After 53 minutes, TC1 and TC2 read 26° C. and 22° C., respectively, and heavy duty Al foil (4.90 g) from Alcan Aluminum Limited was added to the solution. There was vigorous reaction. This is referred to as time zero, the start of the reaction.

Figure 2:
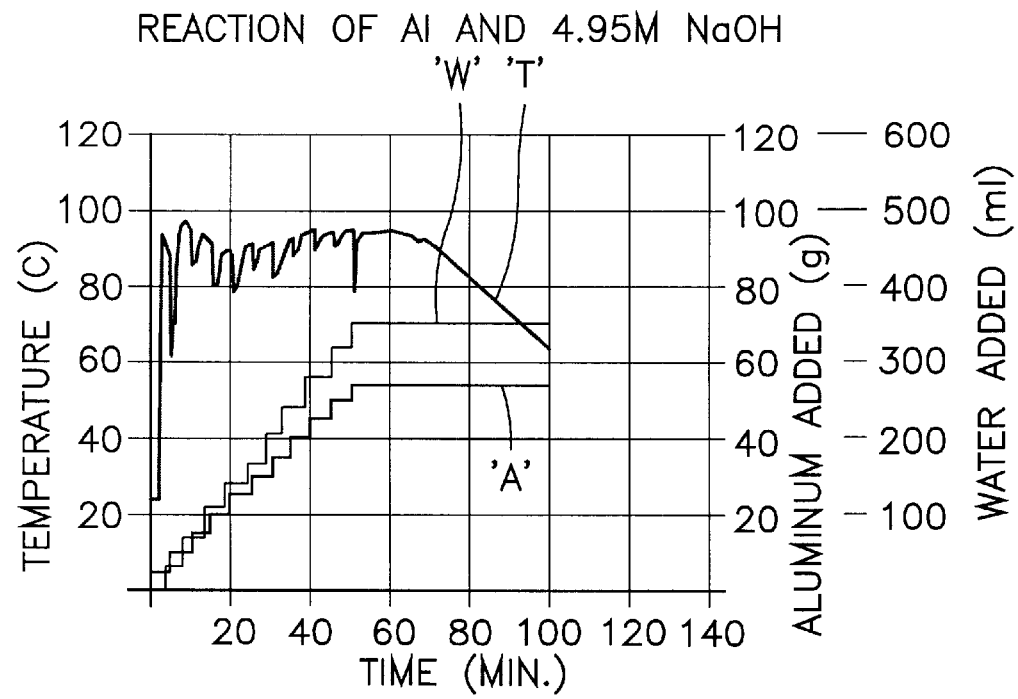
FIG. 2 is a graph illustrating a second reaction of aluminum with water to produce hydrogen gas, in a 4.95 M sodium hydroxide solution, carried out over a period of about 100 minutes.

After four minutes, water (35 ml) was added to the solution. Al foil and water were added at five minutes intervals. The flask was swirled periodically. No further NaOH was added. FIG. 2 illustrates the response of this reaction in Experiment 2-2.

The reaction was monitored for about 90 minutes. During that period a total of 53.32 grams of aluminum was consumed and 350 ml of water was added to the initial quantity. The quantity of aluminum added corresponds to about 3.9 times the amount predicted by formulas (3) and (5), and about 11.8 times the amount predicted by equation (4). Again this confirms that the reaction according to the present invention proceeds according to equation (1) or (2). In this experiment, there was no occasion in which Al was added that the temperature of the vapour being emitted did not increase two to three minutes of the Al being added. A sharp drop in the temperature was observed about one minute after the addition of water. This is to be expected since the water was at room temperature (~23° C.) and it was poured in through the top of the flask. Thus, it would cool the system momentarily.

In both Experiments 2-1 and 2-2, there was no indication that the reaction would not have proceeded indefinitely if more Al had been added. The regular addition of Al and the fact that the temperature of the vapour remained above 80° C., except when water was added, indicate that the reaction proceeded directly and no time was there a pause in the reaction to permit the regeneration of any reagent species as predicted by the formula (6).

The following Experiments 2-3 and 2-4 were carried out at temperature of 45° C. or less to determine whether the reaction would be sustainable at these temperatures. The composition of the precipitate forming in the reaction at these temperatures, as well as the composition of the gases emitted were also analysed.

Experiment 2-3
Collection of Precipitate at an Early Stage of the Reaction

Sodium hydroxide (NaOH) pellets (39.92 g) from Wiler Fine Chemicals, Lot #14449, were placed in a two liter Erlenmeyer flask. Tap water (182 ml) was added to the flask. The mixture was swirled and allowed to stand on the lab bench over night. Then it was swirled again to dissolve the remaining NaOH and mix the solution. The solution was then transferred to a 400 ml beaker.

Commercial aluminum foil (24.23 g), namely Reynolds Wrap™, a Registered Trade Mark of Canadian Reynolds Metal Company, Ltd., was>weighed, folded, and cut into portions that ranged in weight from 0.5 g to 1.5 g. The beaker containing the NaOH solution was placed in a water bath which was cooled with ice cubes. Thermometers were placed in both the water bath and the beaker. Care was taken to ensure the temperature of the solution in the beaker was kept at or below about 45° C. In each case, the temperatures of the solutions were read and recorded just before the portions of Al were added. At 29, 44, and 50 minute the reaction beaker was removed from the water bath to try to keep the reaction temperature as close to 45° C. as possible.

Figure 3:
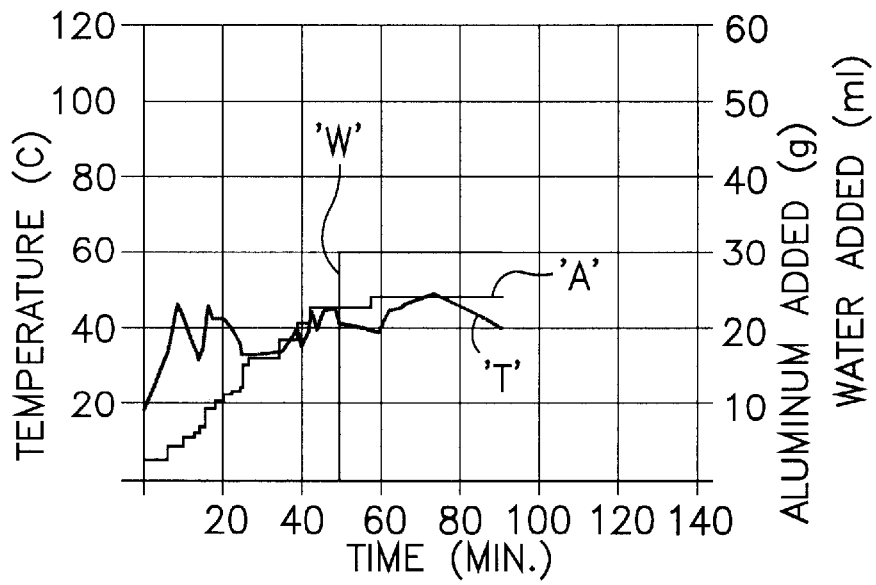
FIG. 3 is a graph illustrating a third reaction of aluminum with water in a 4.5 M sodium hydroxide solution, while keeping the temperature relatively low.

The Al foil was added in portions over a 59 minute period. When the Al was added to the initial reaction mixture, gas bubbles were observed to form after about 45 seconds. It was noted that when gas bubbles formed on the surface of the Al, the piece of Al floated at or near the top of the reaction mixture. A small amount of fine black material was observed to float in the reaction mixture after all the Al has been dissolved. By the 44$^{th}$ minute, the reaction mixture was observed to be very viscous because of the formation of a solid material. At 50 minute, tap water (30 ml) was added to the reaction mixture. This Experiment 2-3 is explained graphically in FIG. 3.

The solution was allowed to cool to room temperature, then it was filtered through a porcelain suction funnel without any filter paper to ensure there was no un-reacted Al present in the reaction mixture which could distort the analysis of the precipitate. The cloudy, grey, viscous material which passed through the funnel was filtered using a paper towel. It was washed with tap water. The final precipitate, a light grey solid, was allowed to stand in the fume hood overnight, then a portion of it, labelled P3-1, was dried in an oven at 102° C. After 45 minutes the sample was sealed in a plastic bag and taken to an Electron Microscopy Unit for analysis. The results of this analysis are presented in Table 4.

Experiment 2-4
Collection of Precipitate at an Advanced Stage of the Reaction

Figure 4:
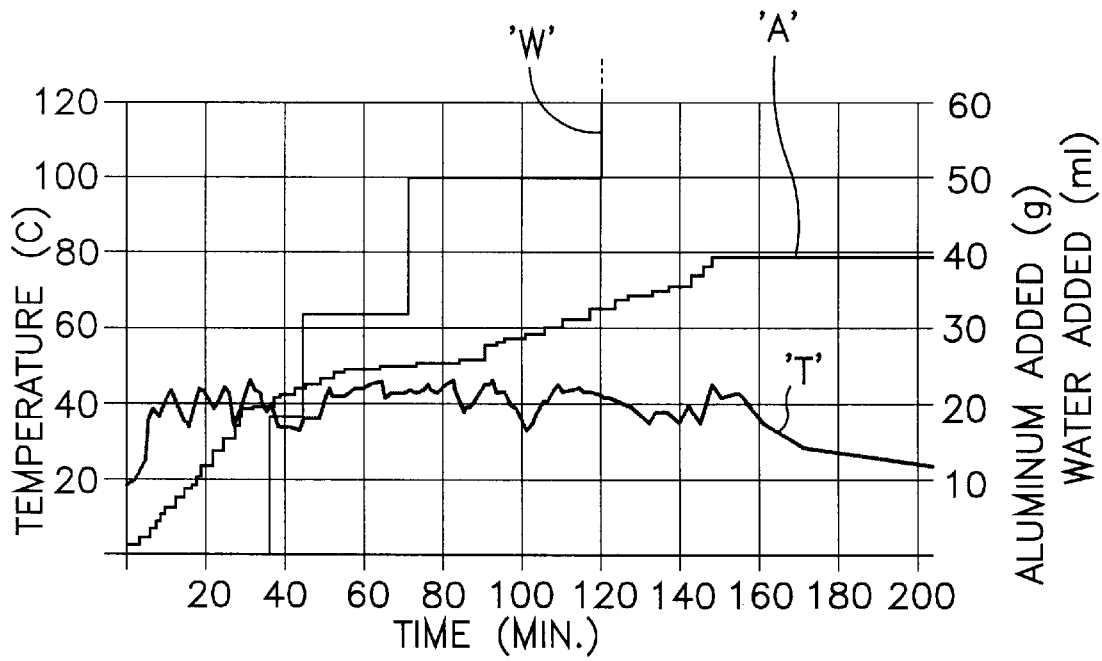
FIG. 4 is a graph illustrating a fourth reaction of aluminum with water in a 4.5 M sodium hydroxide solution, while keeping the temperature relatively low.

A 400 ml beaker containing tap water (175 ml) in which NaOH pellets (38.11 g) had been dissolved was placed in a water bath which was cooled by ice cubes. Al foil (39.26 g) was weighed, folded and cut into portions ranging up to 2 g. Both the NaOH and the Al came from the same source as described in Experiment 2-3. The Al foil was added to the NaOH solution over a 148 minute period following the same procedure as in Experiment 2-3. Additional water, totalling 70 ml, was added in four portions during the Experiment 2-4 at the times shown in FIG. 4.

The reaction mixture was allowed to stand in the fume hood for about two hours after the addition of the last portion of Al, by which time the mixture had stopped bubbling. Part of the mixture was then filtered through a fine plastic mesh to ensure no un-reacted Al could contaminate the sample to be analysed. The mixture which passed through the mesh was then filtered by suction using qualitative filter paper. A sample of this grey precipitate was taken without washing and labelled P4-1. The remainder of the precipitate was removed from the filter paper and swirled with tap water in a flask, then it was re-filtered and washed with tap water.

A sample of the washed precipitate was taken and labelled P4-2. Both samples were dried in an oven at 102° C. for about an hour then they were sealed in a plastic bag and taken to the Electron Microscopy Unit for analysis. The results of the analysis are given in Tables 5 and 6.

The samples taken from Experiments 2-3 and 2-4 were analysed using a JEOL-6400 Scanning Electron Microscope (SEM) equipped with a Link eXL x-ray microanalyser. An accelerating voltage of 15 kV and a probe current of 1.5 nA were employed, and spectral collection times were 200s for sample P3-1 and 120s for samples P4-1 and P4-2. The results are; reported as oxide weight percent values, although oxygen was not analysed. Oxide values were calculated from elemental analyses using specified oxide stoichiometries. The minimum detection limits for NaOH under these conditions are approximately 0.38 wt. % for sample P3-1 and 0.5 wt. % for samples P4-1 and P4-2.

TABLE 4

Sample P3-1.

| | | | | | |
|---|---|---|---|---|---|
| $SiO_2$ | n.d. | n.d. | 0.23 | 0.32 | 0.18 |
| $TiO_2$ | n.d. | n.d. | n.d. | n.d. | n.d. |
| $Al_2O_3$ | 59.71 | 67.63 | 80.08 | 57.50 | 70.11 |
| FeO | 0.27 | 0.28 | 0.33 | 0.30 | 0.44 |
| MnO | n.d | n.d. | n.d. | n.d. | n.d. |
| MgO | n.d. | n.d. | n.d. | n.d. | n.d. |
| CaO | 0.26 | 0.28 | 0.35 | 0.41 | 0.18 |

TABLE 4-continued

Sample P3-1.

| | | | | | |
|---|---|---|---|---|---|
| $Na_2O$ | 0.39 | n.d. | n.d. | n.d. | n.d. |
| $K_2O$ | n.d. | n.d. | n.d. | n.d. | n.d. |
| CuO | 0.38 | 0.46 | 0.42 | 0.70 | 0.41 |
| Total | 61.01 | 68.65 | 81.41 | 59.23 | 71.32 | n.d. = not detected

TABLE 5

Sample P4-1.

| | | | | | |
|---|---|---|---|---|---|
| $SiO_2$ | 0.21 | 0.27 | n.d. | n.d. | n.d. |
| $TiO_2$ | n.d. | n.d. | n.d. | n.d. | n.d. |
| $Al_2O_3$ | 63.05 | 54.87 | 62.40 | 63.02 | 74.57 |
| FeO | 0.26 | 0.26 | n.d | 0.29 | 0.32 |
| MnO | n.d | n.d. | n.d. | n.d. | n.d. |
| MgO | n.d. | n.d. | n.d. | n.d. | n.d. |
| CaO | n.d. | n.d. | n.d. | n.d. | n.d. |
| $Na_2O$ | 8.03 | 11.21 | 9.46 | 4.02 | 4.25 |
| $K_2O$ | n.d. | n.d. | n.d. | n.d. | n.d. |
| CuO | n.d. | n.d. | n.d. | 0.37 | n.d. |
| Total | 71.55 | 66.61 | 71.86 | 67.70 | 79.14 | n.d. = not detected

TABLE 6

Sample P4-2.

| | | | | | |
|---|---|---|---|---|---|
| $SiO_2$ | n.d. | 0.29 | n.d. | n.d. | 0.22 |
| $TiO_2$ | n.d. | n.d. | n.d. | n.d. | n.d. |
| $Al_2O_3$ | 70.96 | 72.01 | 63.77 | 69.72 | 65.80 |
| FeO | 0.30 | 0.35 | 0.32 | 0.23 | 0.28 |
| MnO | n.d | n.d. | n.d. | n.d. | n.d. |
| MgO | n.d. | n.d. | n.d. | n.d. | n.d. |
| CaO | 0.18 | 0.10 | 0.16 | n.d. | 0.14 |
| $Na_2O$ | n.d. | 0.69 | n.d. | n.d. | n.d. |
| $K_2O$ | n.d. | n.d. | n.d. | n.d. | n.d. |
| CuO | 0.42 | 0.37 | 0.30 | 0.42 | 0.51 |
| Total | 71.86 | 73.81 | 64.55 | 70.37 | 66.95 | n.d. = not detected

The results presented in Tables 4–6 show the precipitate formed does not contain sodium beyond what could reasonably be expected to be present in an impure material precipitated from a concentrated NaOH solution. In no case was the quantity of sodium in the precipitate present in amounts exceeding 1.1% of that required by the reaction products specified in equation (3), (4) or (5). Therefore it may be concluded that the precipitate formed is not Na/Al moiety, but is rather primarily an Al/Oxygen material, which may contain some hydrogen in the form of hydroxyl groups or water molecules.

The two samples collected and analysed in Experiment 2-4 show two things, namely, the washing of the precipitate with water removes significant amounts of Na; and that none of the five measurements on the unwashed precipitate showed levels of Na which exceeded more than 34% of that necessary to form the compounds given in equation (3), (4) or (5). Indeed, the average sodium content of the five measurements was less than one-fifth of that necessary to form the compounds given in equation (3), (4), or (5). This removes any possibility that the Na/Al substances as shown in equation (3), (4) or (5) was at one time present in the reaction precipitate and was subsequently changed to an aluminum/oxygen species by washing. If such were the case the Na:Al ratio from sample P4-1 would have had to be at least 1:1. This was not observed. Therefore, it may be concluded that even in the unwashed state the precipitate is primarily an aluminum based compound.

The fact that washing with water readily removes most of the sodium confirms that the sodium species present is water soluble as would be expected for an ionic species containing sodium.

Experiment 2-5

Activeness of the Filtrate

To a small amount (~50 ml) of the filtrate from the first filtration in Experiment 2-4, was added Al foil (0.5 g). Within about 60 seconds, bubbling started and the Al completely dissolved, and a grey precipitate formed in this previously clear solution.

Experiment 2-6

Collection of Gases.

To tap water (182 ml) in a four liter plastic bottle was added NaOH pellets (40.15 g). The bottle was covered, shaken and the solution allowed to come to room temperature after the NaOH had dissolved. The bottle was then placed in a water bath at 18° C. Al foil (14.8 g) was added in three portions of about 5 g each. Both the Al and NaOH came from the same source as described in Experiment 2-3. After the first portion of Al (4.63 g) was added, the bottle was capped with a lid fitted with a hose. Bubbles started to form on the surface of the Al after about 10 seconds. Bubbles came out of the hose, which was submerged in the water bath, after about 40 seconds. The Al had completely reacted within about three minutes. The lid was removed from the bottle and a second portion of Al foil (4.98 g) was added and the bottle recapped. Bubbling from the hose started after about 30 seconds, the hose was connected to a gas sampling bag and sample P6-1 was collected. The addition of Al foil (5.19 g) was repeated and gas sample P6-2 was collected. Both gas samples were analysed. The analytic data and the normalized results are summarized in Table 7.

TABLE 7

Gas Analysis.

| Sample # | Observed Concentrations | | Normalized Concentrations | |
|---|---|---|---|---|
| | P6-1 | P6-2 | P6-1 | P6-2 |
| Oxygen | 2% | 1% | 2% | 1% |
| Nitrogen | 7% | 2% | 7% | 2% |
| Hydrogen | 86% | 92% | 91% | 97% |
| Total | 95% | 95% | 100% | 100% |

Experiments 3-1 to 3-15

A series of fifteen experiments was carried out using NaOH concentrations which ranged from about 0.25M to a saturated solution of NaOH in water at room temperature. The saturated solution was about 19M. Thirteen of these experiments were recorded on graphs, and are shown in the accompanying FIGS. 5–17. On these graphs, the labels 'T', 'A' and 'W' designate the temperature of the reaction, and the aluminum and water added respectively as in the previous graphs. The label 'S' has been added, however. The line 'S' across each graph designates the amount of aluminum that would react with the initial amount of NaOH if the reaction would proceed according to the equation (3), (4) or (5). This amount is also referred to herein as the stoichiometric amount of aluminum.

Solutions of NaOH were typically cooled before starting the reactions. The starting temperature for each reaction was often in the range of 4–10° C. The reactions were carried out in glass vessels ranging in size from 25 ml to 500 ml. Solutions of NaOH were prepared by dissolving NaOH pellets from BDH Inc., Toronto, Ontario, Canada, M8Z 1K5, Lot #128142-125228, in tap water at room temperature. The heat of solvation was allowed to dissipate and the portion of the solution to be used in the experiment was cooled in an ice bath in the reaction vessel.

A thermocouple junction was placed in the solution about one centimeter below the surface. The thermocouple reading was monitored continually and recorded on a computer file every 15 seconds.

Aluminum foil (Reynolds Wrap from Canadian Reynolds Metals Company Ltd., Montreal, Toronto, Calgary, Canada) was crumpled or folded and added in portions ranging from 0.2 g to 1.1 g. Each portion of Al foil was initially submerged in the solution using a glass stirring rod. Then it was allowed to float to the top of the solution. The start time for every experiment was the time when the first aluminum was added. Aluminum was added in amounts to keep the temperature above 60° C.

Water was added in amounts up to 20 ml. Water was only added when the reaction mixture became viscous and foamed more than one centimeter. In most of the experiments, the addition of water started after about 75% of the stoichiometric amount of Al was added. Water was added in sufficient quantities to ensure that the level of the solution was at least one centimeter above the level of the precipitate. In most cases, water was added only after the temperature had reached a peak or a value of at least 75° C. The portions of water were also controlled so that the temperature of the top of the solution did not drop more than 60° C. when the water was added. Aluminum and water were added until at least two times the stoichiometric amount, based on equation (3), had been reached.

After the reaction had ceased the solution was cooled and the precipitate was suction-filtered, and rinsed while still in the suction funnel with about 250 ml of tap water. Samples from the Experiments 3-1 to 3-15 were sent for elemental analysis of the precipitate and the hydrogen gas. The results of these analyses are shown in Table 8.

TABLE 8

Catalytic Ratios and Product Analysis.

| Test (#) | [NaOH] (M) | Catalytic Ratio | [Al$_2$O$_3$] (%) | [Na$_2$O] (%) | H$_2$ (%) |
|---|---|---|---|---|---|
| 3-1 | 0.26 | 3.0 | 98.3 | <0.71 | |
| 3-2 | 0.60 | 3.1 | 98.9 | <0.71 | |

TABLE 8-continued

Catalytic Ratios and Product Analysis.

| Test (#) | [NaOH] (M) | Catalytic Ratio | [Al$_2$O$_3$] (%) | [Na$_2$O] (%) | H$_2$ (%) |
|---|---|---|---|---|---|
| 3-3 | 1.2 | 4.2 | 96.3 | 1.14 | |
| 3-4 | 2.5 | 3.3 | 98.7 | 0.7 | |
| 3-5 | 3.9 | 3.9 | 96.8 | <0.71 | |
| 3-6 | 4.8 | 3.4 | | | |
| 3-7 | 5.5 | 4.5 | 98.6 | <0.71 | |
| 3-8 | 6.0 | 2.6 | | | |
| 3-9 | 6.0 | 3.3 | 98.6 | <0.71 | 97 |
| 3-10 | 6.1 | 4.2 | | | |
| 3-11 | 6.1 | 3.2 | 99.3 | <0.71 | |
| 3-12 | 6.1 | 3.8 | 98.3 | <0.71 | |
| 3-13 | 6.7 | 3.3 | 99.1 | <0.71 | |
| 3-14 | 11.3 | 2.7 | 97.3 | <0.71 | 98 |
| 3-15 | 19 | 2.7 | 99.1 | 0.79 | 97 |

The expression "catalytic ratio" in the above table is calculated by dividing the amount of Al that actually reacted by the amount that would have reacted if the reaction were stoichiometric with respect to NaOH as in equation (3), (4) or (5).

Table 8 also shows the results of the analyses of the precipitates filtered from twelve of the experiments. In every case the concentration of the Al species is larger than 96%. Sodium was detectable in only three of the samples, and then at a maximum concentration of only 1.14% or less. Thus, aluminum is present in the precipitate at levels that are two orders of magnitude above sodium.

Figure 5:
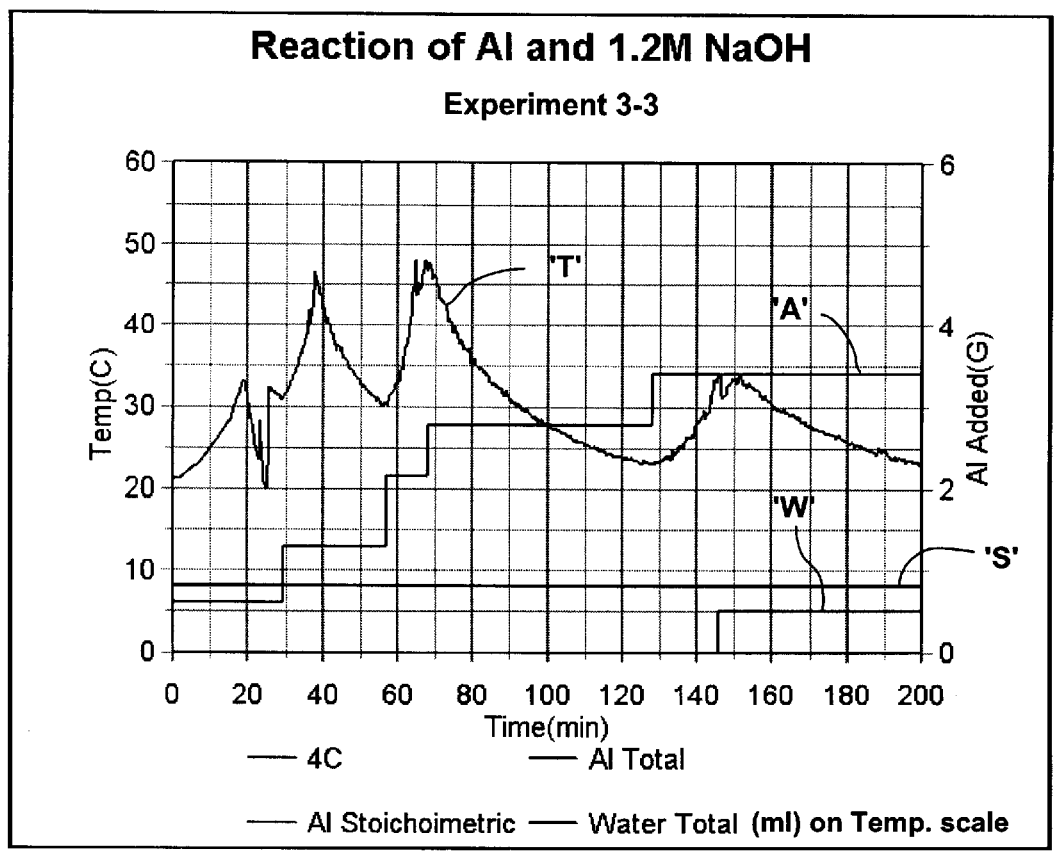
FIG. 5 is a graph illustrating a reaction of aluminum with water in a 1.2 M NaOH solution.
Figure 6:
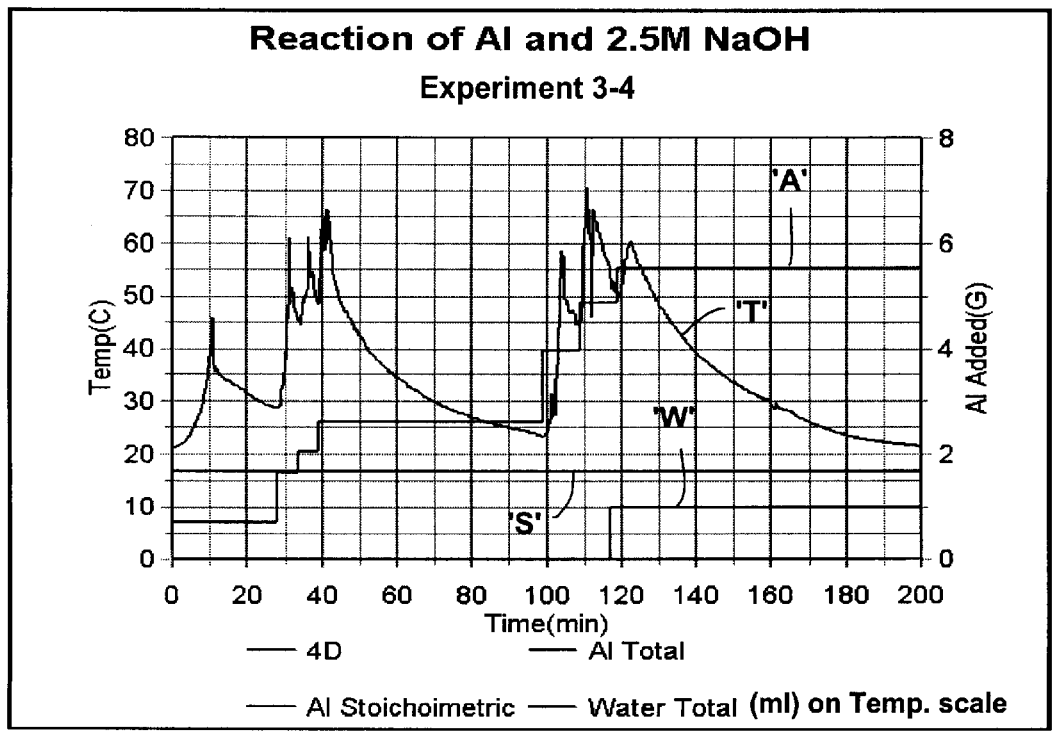
FIG. 6 is a graph illustrating a reaction of aluminum with water in a 2.5 M NaOH solution.
Figure 7:
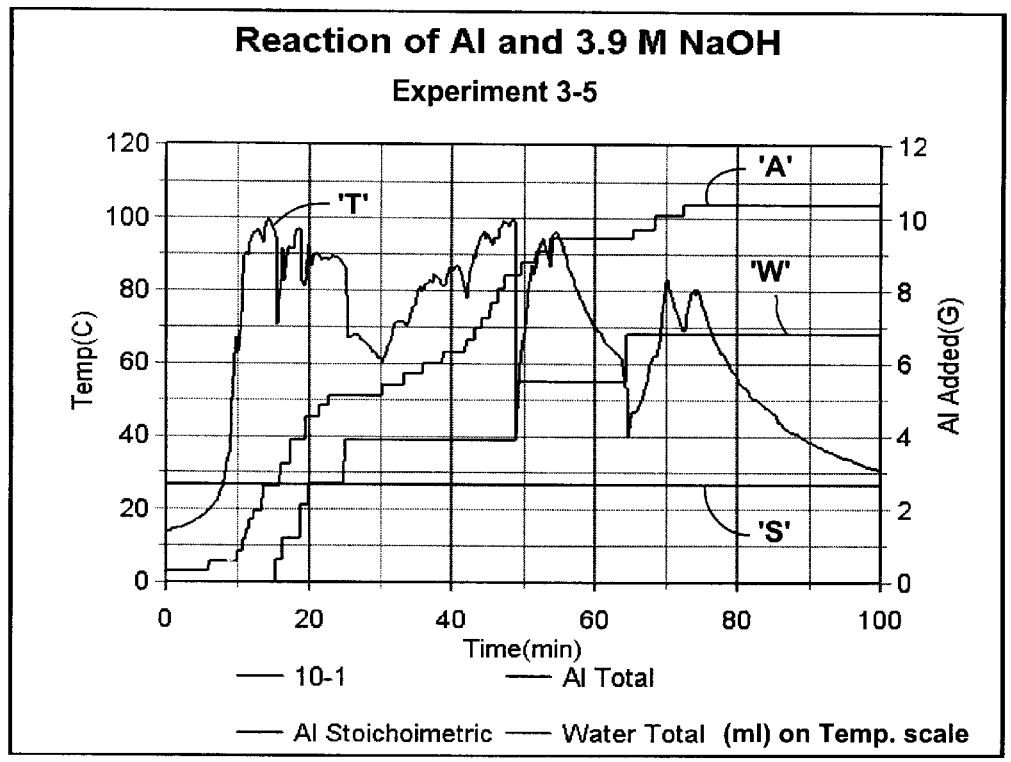
FIG. 7 is a graph illustrating a reaction of aluminum with water in a 3.9 M NaOH solution.
Figure 8:
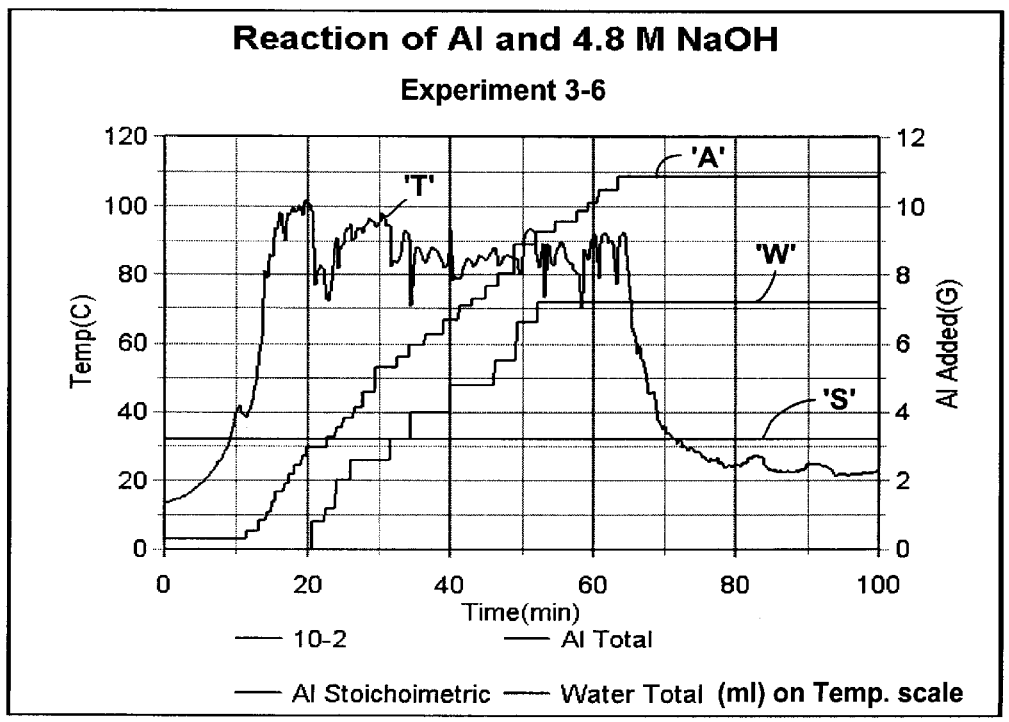
FIG. 8 is a graph illustrating a reaction of aluminum with water in a 4.8 M NaOH solution.
Figure 9:
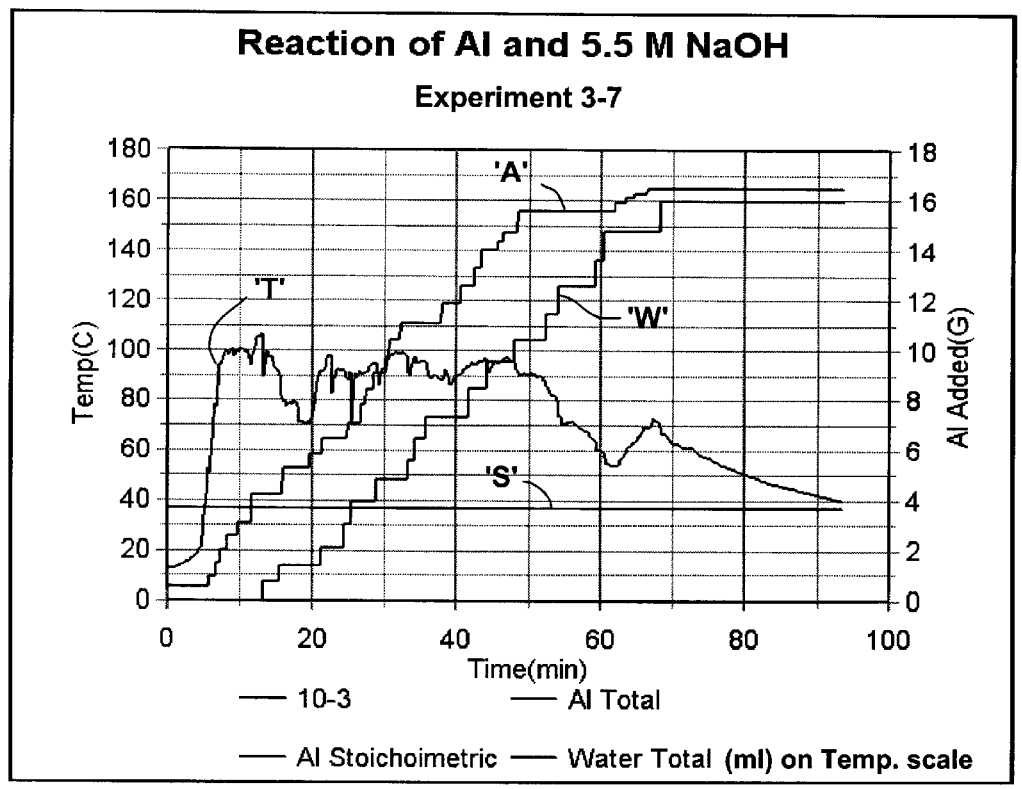
FIG. 9 is a graph illustrating a reaction of aluminum with water in a 5.5 M NaOH solution.
Figure 10:
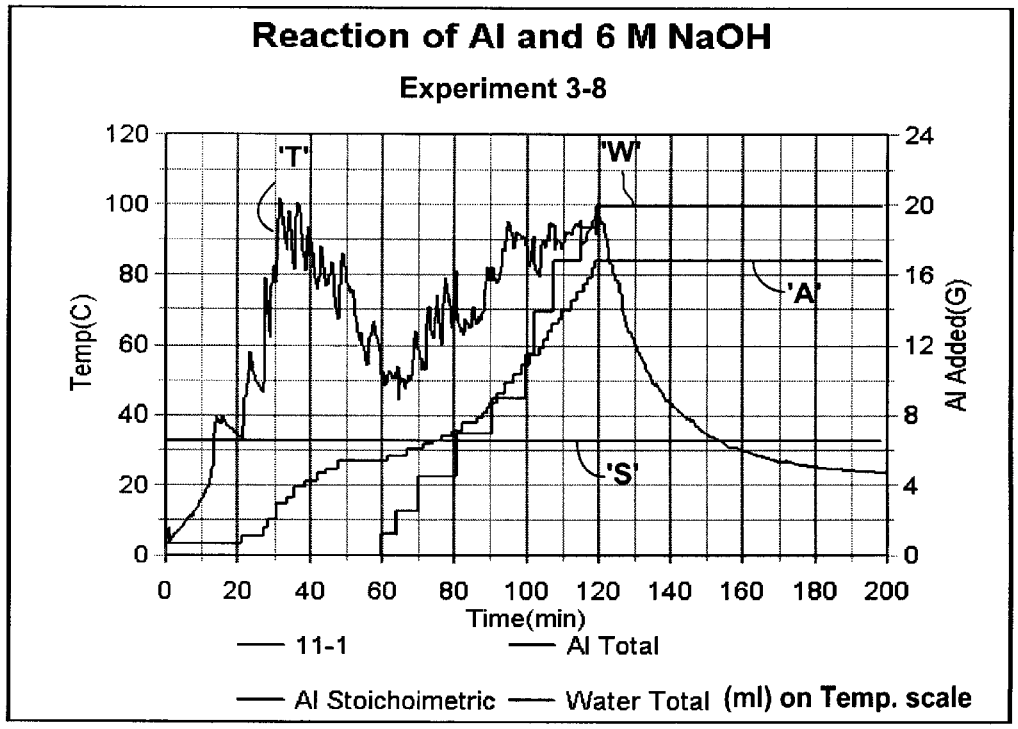
FIG. 10 is a graph illustrating a reaction of aluminum with water in a 6 M NaOH solution.
Figure 11:
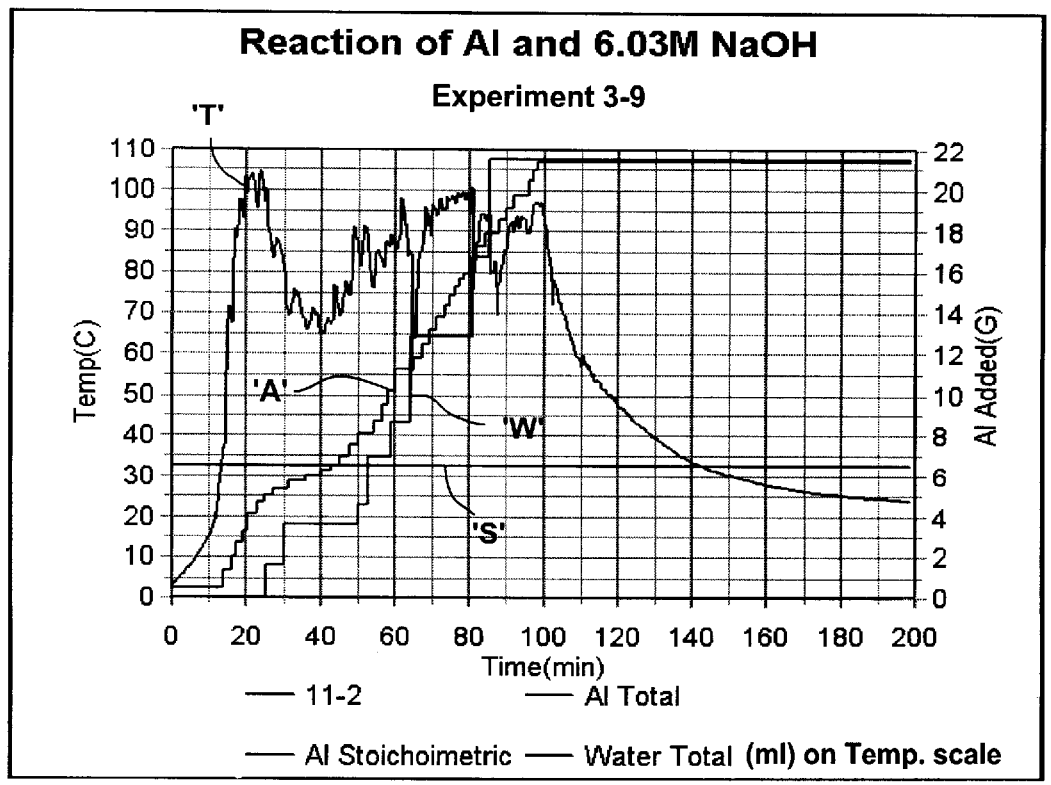
FIG. 11 is a graph illustrating a reaction of aluminum with water in a 6.03 M NaOH solution.
Figure 12:
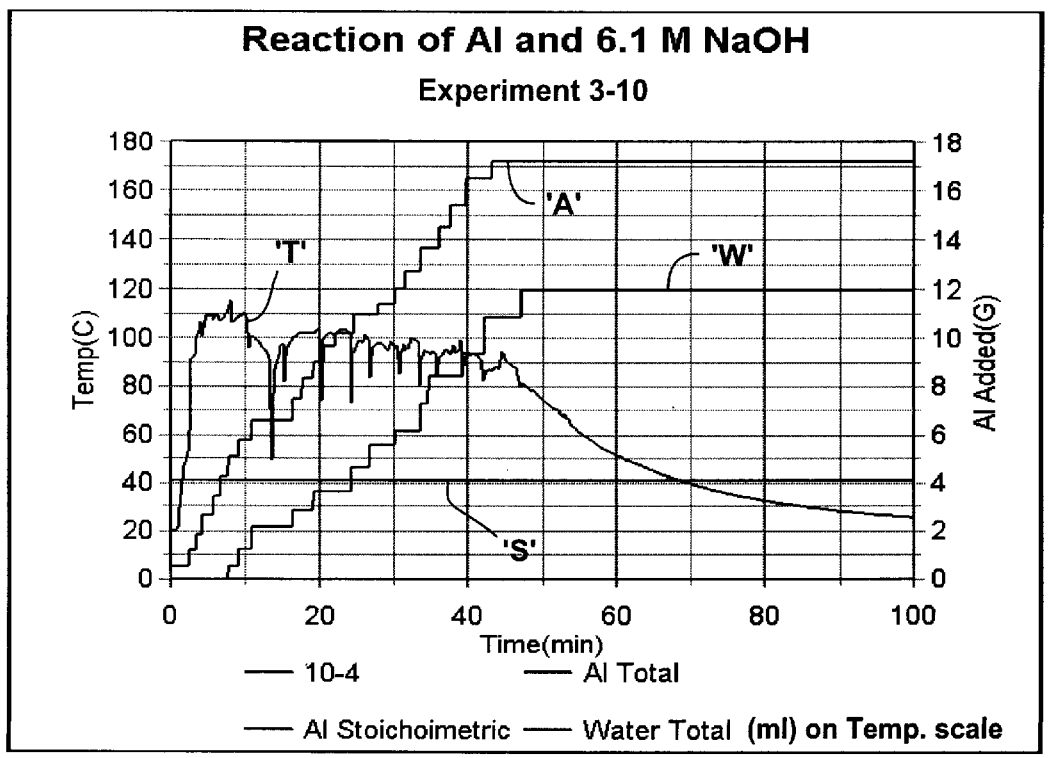
FIG. 12 is a graph illustrating a reaction of aluminum with water in a 6.1 M NaOH solution.
Figure 13:
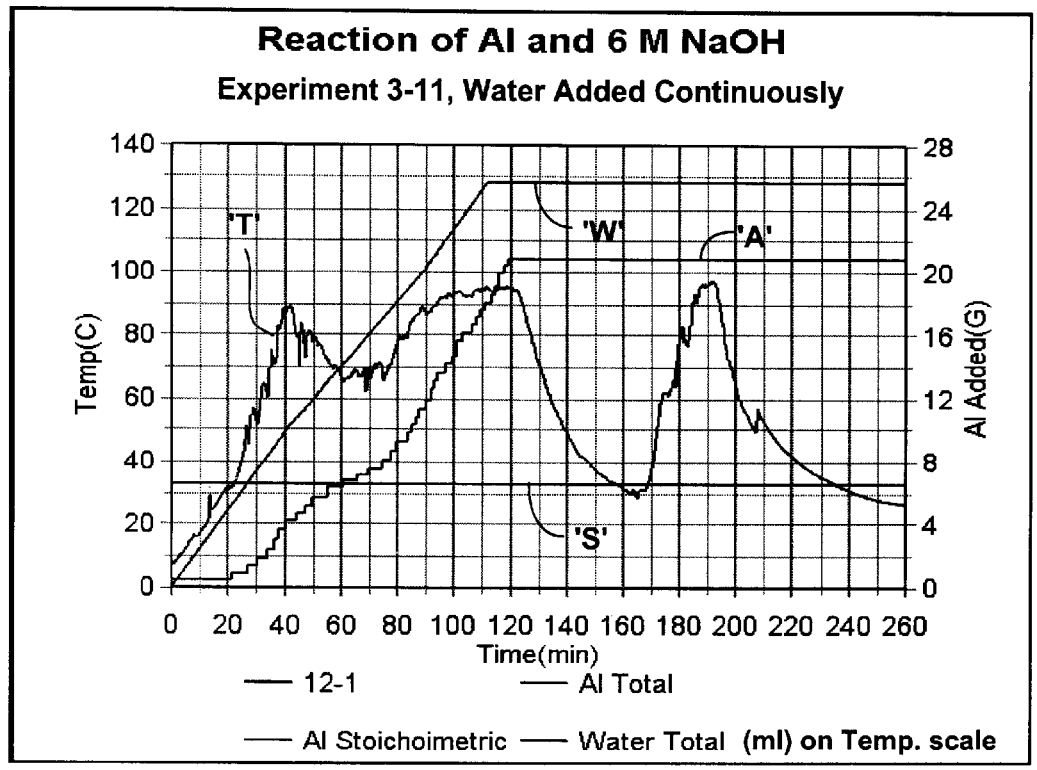
FIG. 13 is a graph illustrating a reaction of aluminum with water in a 6 M NaOH solution, wherein the water was added continuously.
Figure 14:
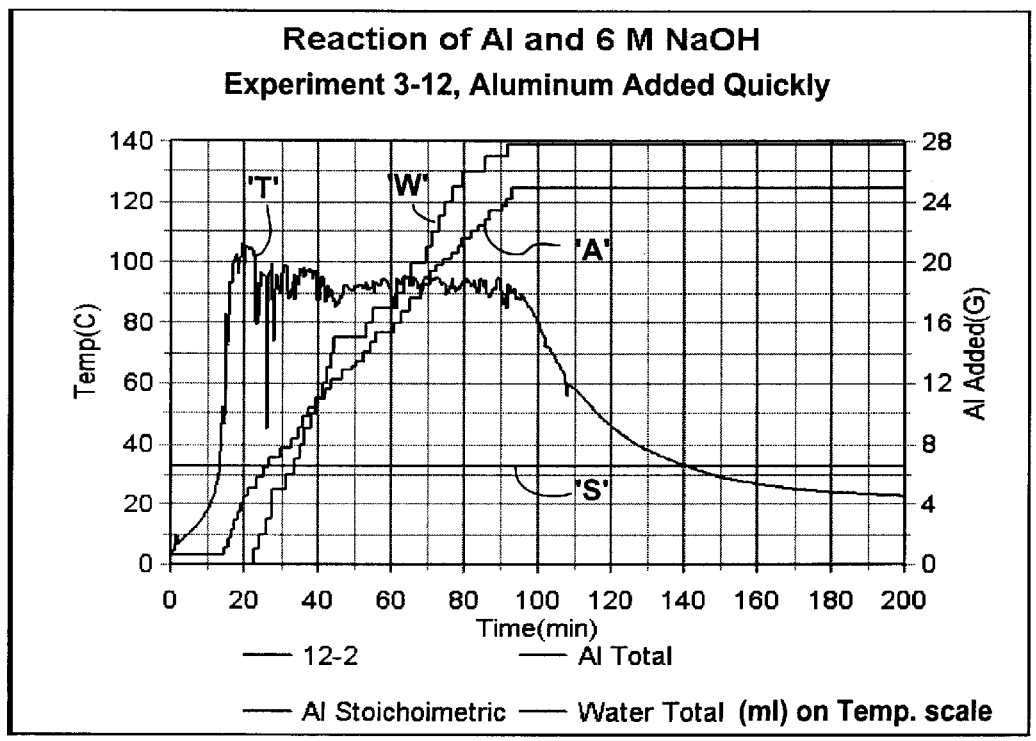
FIG. 14 is a graph illustrating a reaction of aluminum with water in a 6 M NaOH solution, wherein the aluminum was added quickly.
Figure 15:
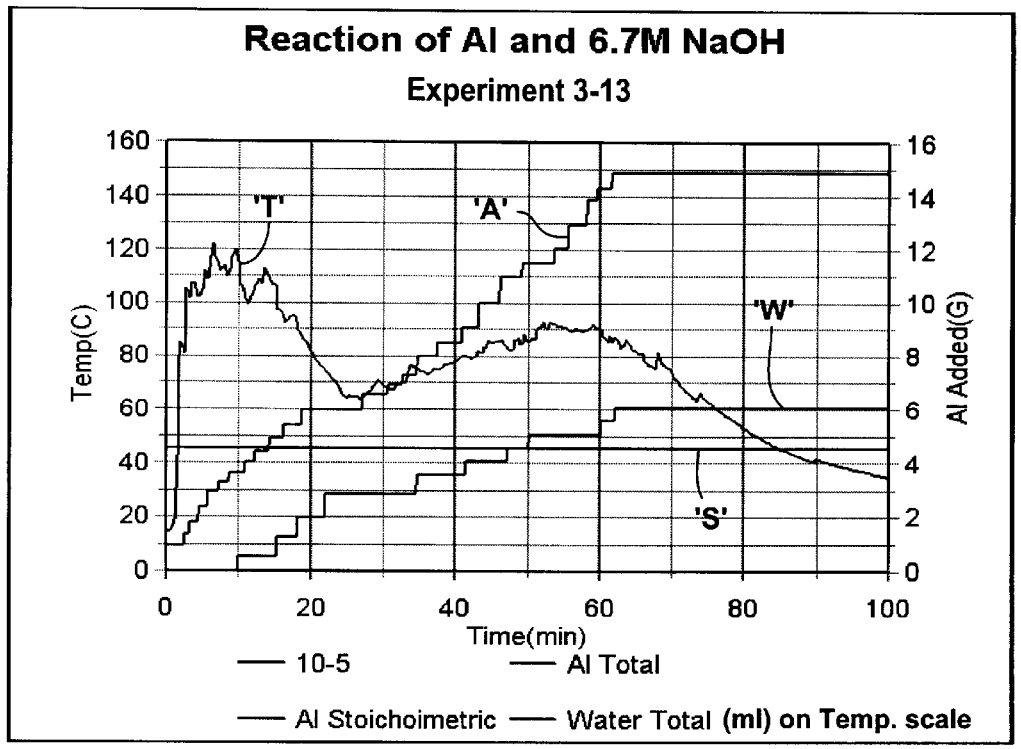
FIG. 15 is a graph illustrating a reaction of aluminum with water in a 6.7 M NaOH solution.
Figure 16:
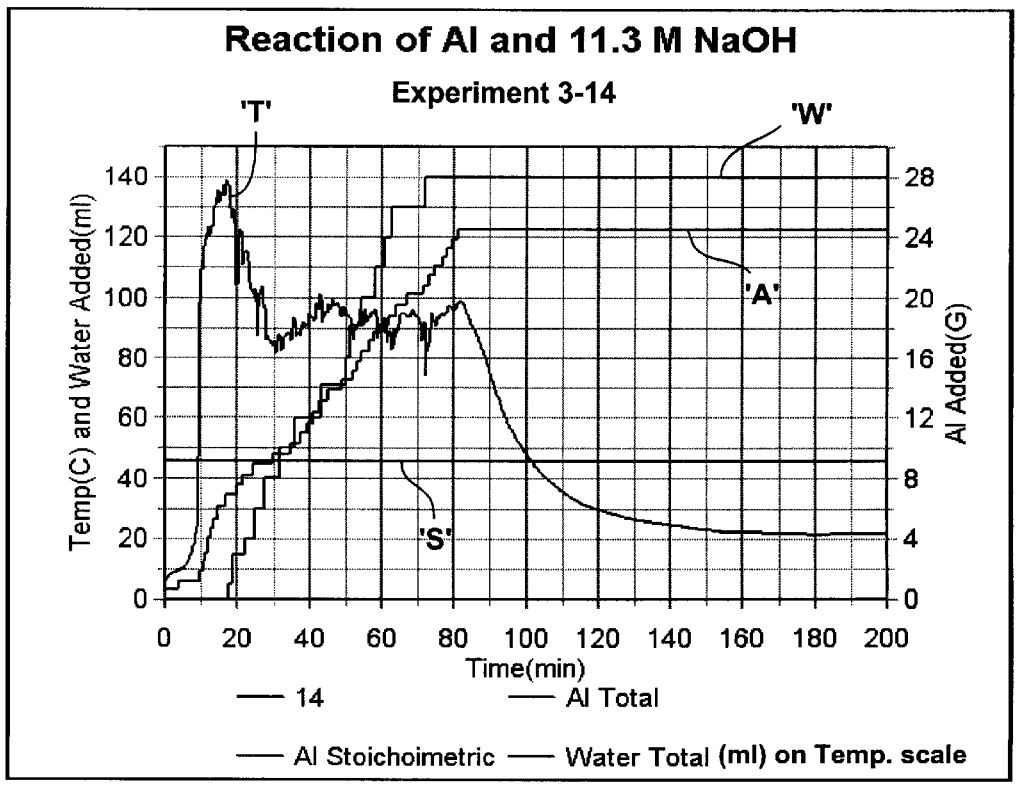
FIG. 16 is a graph illustrating a reaction of aluminum with water in a 11.3 M NaOH solution.
Figure 17:
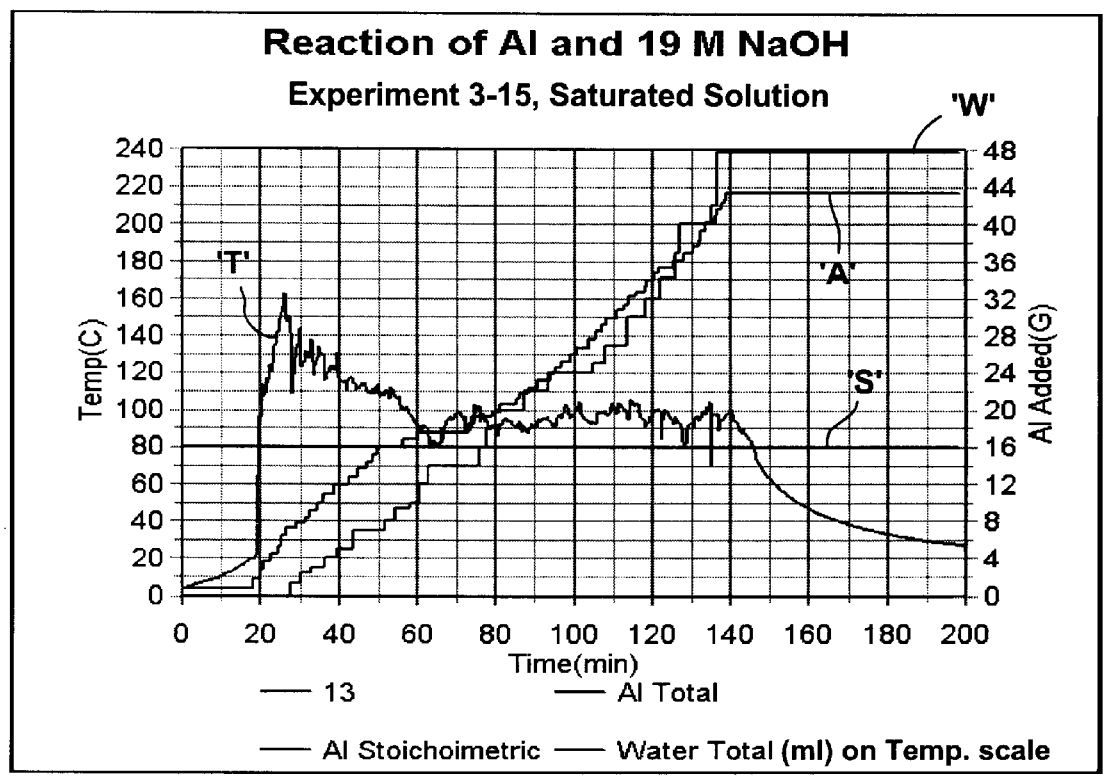
FIG. 17 is a graph illustrating a reaction of aluminum with water in a saturated 19 M NaOH solution.

It may be concluded that the reaction according to the present invention is catalytic in aqueous solutions from 0.26 M NaOH to 19 M NaOH. It should be noted that although the 0.26 M and 0.60 M solutions showed a catalytic reaction, the reaction temperature did not rise above 30° C. during those experiments. However, FIG. 5 shows that the temperature of the 1.2 M solution rose above 45° C. even though the Al was added very slowly and only after the previous portion had dissolved.

The results in FIGS. 5–17 show that the reaction can and does occur over a temperature range from 4° C. to 165° C. In one experiment with the saturated solution a temperature of 170° C. was observed. The molal boiling point elevation constant will result in a higher boiling point for the more concentrated solutions, ensuring that water does not boil off until the higher boiling point is reached. In the case of the saturated solution from Experiment 3-15, the boiling point elevation would have contributed to the high boiling point of the solution. It was also noted that NaOH did not precipitate from the solution even at the higher concentration, probably because of the known higher solubility of NaOH in hot aqueous solutions.

It was found that at about 75% of the stoichiometric amount the solution would become viscous and foaming with large longer-lasting bubbles. Water was added at this point and often the addition of Al had to be slowed down or an excess of un-reacted aluminum could be observed.

The formation of a greyish-white precipitate would start between 75% and 100% of the stoichiometric amount. Once the precipitate started to form it was necessary to keep the reaction zone above the precipitate a distance of about 1 cm, or the precipitate would mix with the bubbling aluminum and form a more viscous foam which on occasion overflowed the reaction vessel.

Based on all the experiments described herein, it will be appreciated that the present process to produce hydrogen is reproducible with aqueous solutions from 1.2 M NaOH to 19 M NaOH and over a temperature range from 4° C. to greater than 170° C. Furthermore, the reaction is catalytic over the same temperature range and over a NaOH concentration range of 0.26 M to above 19 M. The reaction's by-product comprises high-purity alumina (Al$_2$O$_3$).

Figure 18:
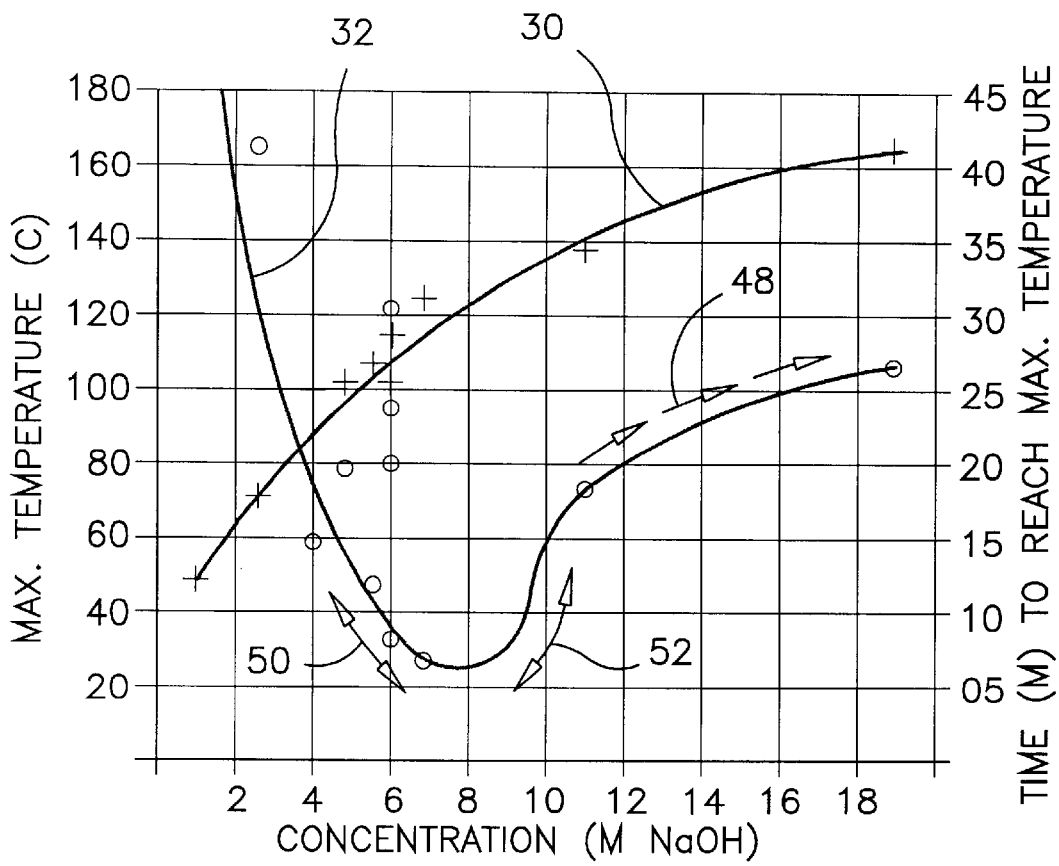
FIG. 18 is graph illustrating maximum reaction temperatures obtained with aqueous solutions of various concentrations, and the responsiveness of the reaction for solutions of various concentrations.

Referring now to the graph in FIG. 18, there is shown therein a first curve 30 showing the maximum temperatures obtained with different NaOH concentrations. This best-fit curve was plotted from the data shown in FIGS. 5–17, and is presented herein for illustrating the effect of NaOH concentration on the maximum temperature of the reaction. FIG. 18 shows another curve 32 which represents the responsiveness of the reaction to aluminum and water additions. This curve has been prepared by plotting the time required to reach the initial maximum temperature of the reactions, against the different NaOH concentrations studied. The resulting best-fit curve is a complex inverted hyperbolic curve centred on a concentration of about 8 M NaOH. This curve indicates that the reaction is highly responsive to fuel additions, when the NaOH concentration is between about 5 M and 10 M, and that the responsiveness decreases rapidly when the NaOH concentration is adjusted away from this median region.

Figure 19:
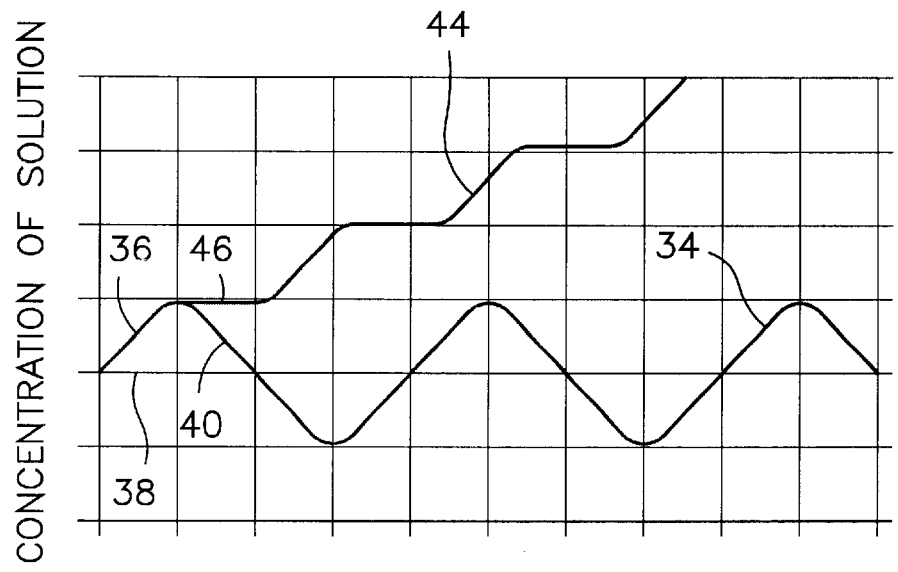
FIG. 19 is a graph showing the effects of adding water to the reaction as, opposed to adding a fixed-molar NaOH solution to the reaction.

Referring now the FIG. 19, there is illustrated therein two curves. The first curve 34 represents the effect of adding plain water to the catalytic reaction of equation (1) or (2). As the reaction proceeds, the water is consumed, and therefore, the concentration of NaOH increases, as shown by the segment: 36, from its initial concentration 38. When water is added, as indicated by segment 40, the concentration drops back to or below the initial concentration 38. If water is added in portions to maintain a certain level in a reaction vessel for example, the solution concentration fluctuates up and down from the initial concentration 38, as generally represented by the curve 34.

If someone is led to believe that the reaction proceeds as in equation (3), (4) or (5), that person would logically add NaOH into the reaction vessel with the makeup water. If NaOH is added to a reaction that actually proceeds according to equation (1) or (2), however, the resulting NaOH concentration of the aqueous solution in the reaction vessel would increase as represented by curve 44. Whether the NaOH is added alone or in a fixed-molar NaOH solution, as represented by segment 46, the NaOH concentration of the solution in the reaction vessel would move quickly toward saturation.

Reference is made again to the curve 32 in FIG. 18. It will be appreciated that a regular addition of a fixed-molar NaOH solution to a reaction that proceeds according to equation (1) or (2) would cause the responsiveness of the reaction to move along the curve 32 as indicated by the series of arrows 48, and quickly reach a region of very low responsiveness. Such migration of the NaOH concentration toward a region of low responsiveness would cause the reaction to cease or to appear to have ceased. The addition of plain water, however, as taught herein, causes the responsiveness of the reaction (1) or (2) to oscillate back and forth along the curve 32 toward and away from a more reactive state, as shown by arrows 50 and 52. These oscillations 50, 52 are believe to stimulate the reaction, and to contribute to some degrees to the catalytic feature of the reaction according to the present invention.

The arrows 50, 52 and the corresponding theory explain the facts that in some experiments, a water addition has caused the reaction to slow down, according to the arrow 50, and in other experiments, the addition of water caused an immediate response, as in 52. The same theory explains why both events can occur in a same experiment, such as when the NaOH concentration is maintained substantially in the median region, between 5 and 10 M NaOH. The curve 44 and arrows 48 on the other hand, explain why prior inventors may have failed to observe a catalytic reaction with the same elements.

It has been found that the reaction proceeds better when water is added after an initial amount of aluminum has been consumed. This phenomenon can also be explained using the curve 32 in FIG. 18. In a low concentration solution, any delay in adding water causes the NaOH concentration to move toward a highly responsive state, such as around 8M for example. An addition of water at that time and a subsequent addition of makeup water causes the NaOH concentration to oscillate within this highly responsive region. On the other hand, if the initial concentration is above 8 M for example, an addition of water brings the concentration back to a highly responsive state, and therefore immediate results can be observed.

Additional Experiments

Additional experiments were carried out using aluminum wire of different gauge sizes and aluminum flakes from the helical casing of armoured electrical wire. Although these additional experiments were not recorded in details, the catalytic effect was observed. Therefore, it is believed that the reaction (1) or (2) is reproducible with aluminum flakes from beverage cans and food packages, aluminum chips, shavings and sawdust found in machine shop waste, and aluminum powder available commercially for different purposes including fireworks, or other small aluminum particles of the like. It is to be expected that the intensity of the reaction depends upon the surface of contact between the aluminum and water. Aluminum foil for example reacts faster than a heavy gauge aluminum wire, and aluminum powder would react almost instantly to produce hydrogen gas.

Preferred Apparatus

Figure 20:
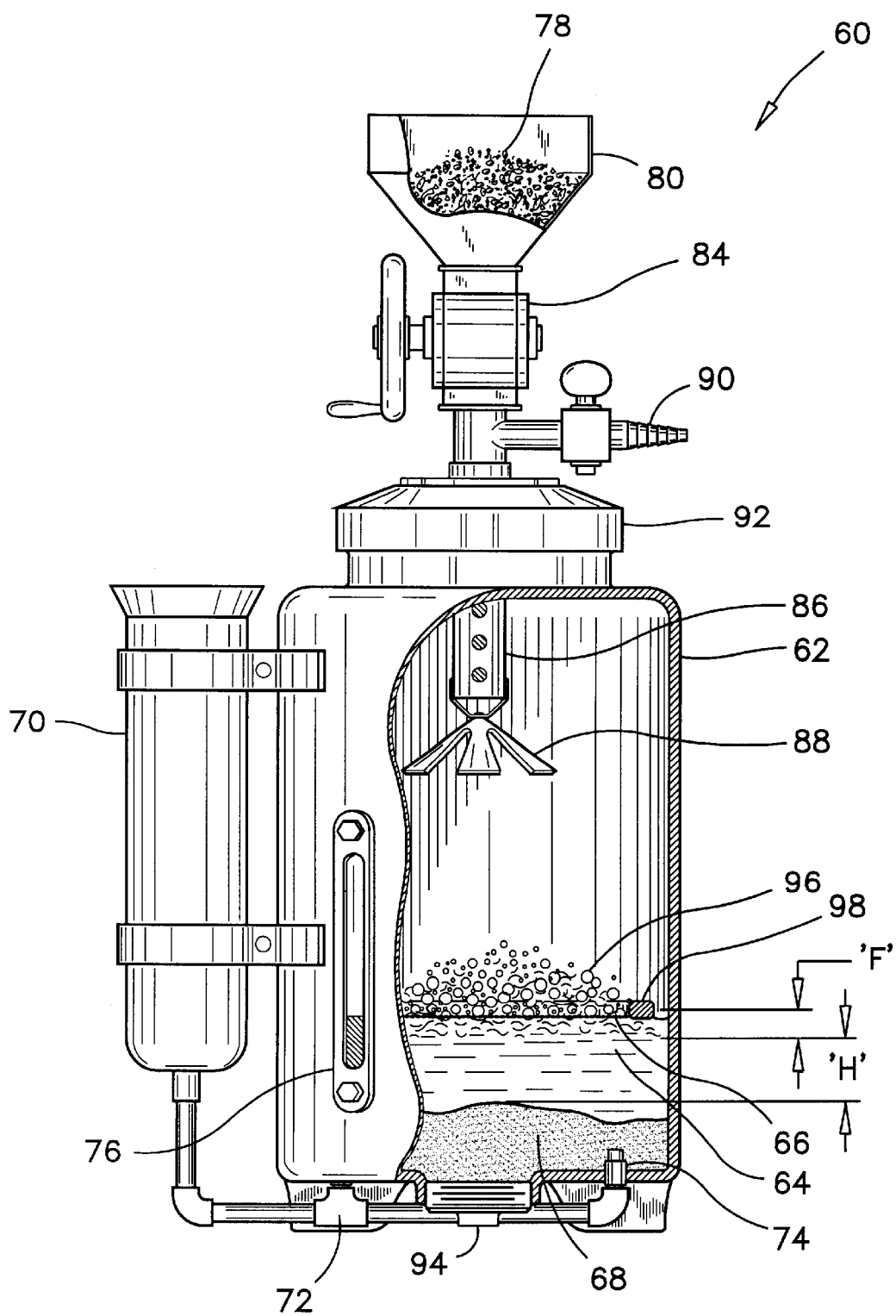
FIG. 20 is a partial cross-section view of an apparatus to produce hydrogen gas, embodying some of the preferred conditions to carry out the process according to the present invention.

A preferred hydrogen generator 60 is illustrated in FIG. 20. The hydrogen generator 60, comprises a reaction vessel 62 made of non-corrosive material, in which the reaction is carried out. A minimum amount of an alkaline solution 64 is maintained in this vessel. During the operation of the generator, it has been found that aluminum particles reacts with water at the surface 66 of the alkaline solution and defines at and near the surface 66, a region of substantial effervescence. This region is defined as the reaction zone 'F'. The height of the reaction zone 'F' vary with the intensity of the reaction, and extends above and below the surface 66 of the alkaline solution 64. During the operation of the generator, a precipitate 68 accumulates at the bottom of the reaction vessel 62. It is recommended to maintain the reaction zone 'F' at a height 'H' of at least about 1 cm above the precipitate 68, to prevent the precipitate from swirling into the reaction zone and mixing with the aluminum particles. Although this dimension can be reduced in some installations, a dimension of one centimeter is suggested herein to enable those skilled in the art to readily use the process according to the present invention successfully.

A water bottle 70 is affixed to the side of the reaction vessel 62 and has a piping system 72 connected to an array of nozzles 74 in the bottom of the reaction vessel 62. Only one nozzle is shown for clarity. The introduction of water through the bottom of the vessel 62 has the effect of capturing some of the heat in the precipitate 68 to preheat the water entering the reaction vessel. A second purpose for the feeding of water through the bottom of the reaction vessel 62 is to entrain to the reaction zone 'F', any sodium hydroxide which may be present in the precipitate 68.

While the distance 'H' of the reaction zone 'F' above the precipitate 68 defines a low limit to the water content in the reaction vessel, the upper limit should be defined as to maintain the concentration of the alkaline solution over about 1M NaOH, and more preferably, a concentration of 5M NaOH. A sight glass 76 on the side of the reaction vessel 62 is provided to monitor the minimum distance 'H' of the reaction zone 'F' above the precipitate 68.

Aluminum particles 78 are delivered into the reaction vessel 62 from a hopper 80 mounted on the top of the vessel 62, though an airlock™ rotary feeder 84 and through a drop pipe 86 at the center of the reaction vessel 62. A deflector 88 is mounted at the end of the drop pipe 86 to disperse the aluminum particles 78 over the entire surface of the alkaline solution 64. The hydrogen generated in the reaction vessel exits through the drop pipe 86 and the spout 90.

The drop pipe 86 is preferably mounted through a large openable cap 92 on the top of the reaction vessel. This cap 92 preferably covers a substantial portion of the upper end of the reaction vessel 62 and provides access to the reaction vessel for periodically cleaning the vessel. A bung 94 is provided in the bottom surface of the reaction vessel 62 to recover the precipitate 68.

The aluminum particles 78 are preferably flakes, sawdust, milling shavings and chips, powder or other similar small particles having a large surface over volume ratio. It has been noticed that aluminum foil fragments for example, have a tendency to float at the surface 66 of the alkaline solution 64. This is preferable and is explained by the buoyancy created by the foam 96 and the bubbling action generate in the reaction zone 'F'. It is believed that the bubbling action and the high temperature in this reaction zone is ideal to prevent or reduce the formation of a protective oxide layer on the surface of the aluminum particles. It is believed that the retention of the aluminum particles in this reaction zone contributes largely to maintaining the catalytic effect.

When relatively dense aluminum particles are used, it is recommended to install a floating screen 98 at the surface of the alkaline solution 64, to retain the aluminum particles in the reaction zone 'F'.

As to other manner of usage and operation of the process according to the present invention, the same should be apparent from the above description and accompanying drawings, and accordingly further discussion relative to these aspects is deemed unnecessary.

We claim:

1. A process for producing hydrogen gas, comprising the steps of:
   providing an aqueous solution in a vessel, said solution containing between 0.26 M and 19 M NaOH;
   introducing aluminum in said solution;
   reacting aluminum with water at a surface of said solution thereby generating a region of effervescence at said surface of said solution and a precipitate; and
   while effecting said step of reacting, forming an accumulation of precipitate at a bottom region of said vessel, separating said region of effervescence from said accumulation and preventing precipitate from said accumulation from mixing with aluminum reacting with water in said region of effervescence.

2. The process as claimed in claim 1, wherein said steps of separating and preventing include the step of maintaining said region of effervescence at a distance of about 1 cm above said accumulation of precipitate.

3. The process as claimed in claim 1, wherein said aqueous solution contains between about 5M and 10 M NaOH.

4. The process as claimed in claim 1, further comprising the step of causing a NaOH concentration in said aqueous solution to oscillate equal amounts up and down.

5. The process as claimed in claim 1, further comprising the step of causing a NaOH concentration in said aqueous solution to oscillate equal amounts between about 5M and 10M NaOH.

6. The process as claimed in claim 1, wherein said step of reacting aluminum with water at a surface of said solution comprises the additional step of retaining said aluminum on a floating screen.

7. The process as claimed in claim 1, further comprising the step of;
   adding water and aluminum in said vessel according to a rate of consumption of said aluminum and said water in said step of reacting.

8. The process as claimed in claim 7, wherein said step of adding water and aluminum in said vessel is carried out in sequence, with said aluminum being added first.

9. The process as claimed in claim 8, wherein said step of adding water is carried out when a temperature in said aqueous solution has reached a peak or 75° C.

10. The process as claimed in claim 1, wherein said precipitate comprises alumina, and further comprising the step of recovering said alumina.

11. The process as claimed in claim 1, wherein said step of separating said region of effervescence from said accumulation comprises the step of adding water to said solution.

12. A process for producing hydrogen gas, comprising the steps of;
   providing an aqueous solution in a vessel, said aqueous solution containing a portion of NaOH and a portion of water;
   introducing a portion of aluminum in said aqueous solution;
   reacting said portion of aluminum with said portion of water, thereby producing hydrogen gas; and
   while effecting said step of reacting, maintaining constant said portion of NaOH in said vessel, adding additional portions of water and additional portions of aluminum in said vessel according to a rate of consumption of said portion of aluminum and said portion of water therein, and causing a concentration of NaOH in said aqueous solution to oscillate equal amounts up and down in response to said rate of consumption of said portion of water in said step of reacting and volumes of water added in said step of adding additional portions of water, respectively.

13. The process as claimed in claim 12, wherein said aqueous solution contains NaOH at a concentration between 1.2 M and 19 M NaOH.

14. The process as claimed in claim 12, further comprising the step of accumulating precipitate in a bottom portion of said vessel, and said step of adding additional portions of water comprises the step of passing said additional portions of water through said precipitate.

15. The process as claimed in claim 12, wherein said step of reacting said portion of aluminum with said portion of water is carried out at a temperature between 4° C. and 170° C.

16. The process as claimed in claim 15, wherein said step of adding additional portion of water is carried out when a temperature in said solution has reached a peak or 75° C.

* * * * *

UNITED STATES PATENT AND TRADEMARK OFFICE
CERTIFICATE OF CORRECTION

PATENT NO. : 6,638,493 B2 Page 1 of 1
DATED : October 28, 2003
INVENTOR(S) : Andersen et al.

It is certified that error appears in the above-identified patent and that said Letters Patent is hereby corrected as shown below:

<u>Column 20,</u>
Line 29, the phrase "to oscillate equal amounts up and down" should read
-- to oscillate up and down from an initial concentration --.

Signed and Sealed this

Twenty-seventh Day of January, 2004

JON W. DUDAS
*Acting Director of the United States Patent and Trademark Office*